United States Patent
Smit et al.

(10) Patent No.: US 8,060,639 B2
(45) Date of Patent: *Nov. 15, 2011

(54) SYSTEM AND METHOD FOR UTILIZING ASYNCHRONOUS CLIENT SERVER COMMUNICATION OBJECTS

(75) Inventors: Mark Hans Smit, Maarssen (NL); Stefan M. van den Oord, EM Best (NL)

(73) Assignee: MasterObjects, Inc., Zeist (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/829,738

(22) Filed: Jul. 2, 2010

(65) Prior Publication Data

US 2011/0106966 A1 May 5, 2011

Related U.S. Application Data

(63) Continuation of application No. 11/257,912, filed on Oct. 25, 2005, now Pat. No. 7,752,326, which is a continuation-in-part of application No. 09/933,493, filed on Aug. 20, 2001.

(60) Provisional application No. 60/622,907, filed on Oct. 28, 2004.

(51) Int. Cl.
*G06F 15/16* (2006.01)
*G06F 7/00* (2006.01)
*G06F 3/00* (2006.01)
*G06F 3/048* (2006.01)

(52) U.S. Cl. ........ 709/231; 709/203; 709/227; 707/706; 707/728; 715/700; 715/733; 715/760; 715/781

(58) Field of Classification Search .......... 709/203, 709/227, 231; 707/706, 728; 715/700, 733, 715/760, 781

See application file for complete search history.

(56) References Cited

U.S. PATENT DOCUMENTS

| | | | |
|---|---|---|---|
| 5,581,753 | A | 12/1996 | Terry et al. |
| 5,632,015 | A | 5/1997 | Zimowski et al. |
| 5,634,127 | A | 5/1997 | Cloud et al. |
| 5,701,461 | A | 12/1997 | Dalal et al. |
| 5,754,771 | A | 5/1998 | Epperson et al. |

(Continued)

FOREIGN PATENT DOCUMENTS

JP    58075272    5/1983

(Continued)

OTHER PUBLICATIONS

Clinick, Andrew, "Remote Scripting," Apr. 12, 1999, Microsoft Corporation, http://msdn.microsoft.com/en-us/library/ms974566(printer).aspx, 6 pages.

(Continued)

*Primary Examiner* — Carl Colin
*Assistant Examiner* — Catherine Thiaw
(74) *Attorney, Agent, or Firm* — Fliesler Meyer LLP

(57) ABSTRACT

A session-based client-server asynchronous information search and retrieval system for sending character-by-character or multi-character strings of data to an intelligent server, that can be configured to immediately analyze the lengthening string and return to the client increasingly appropriate search information. Embodiments include integration within an Internet, web or other online environment, including applications for use in interactive database searching, data entry, online searching, online purchasing, music purchasing, people-searching, and other applications. In some implementations the system may be used to provide dynamically focused suggestions, auto-completed text, or other input-related assistance, to the user.

20 Claims, 30 Drawing Sheets

U.S. PATENT DOCUMENTS

| | | | |
|---|---|---|---|
| 5,802,292 | A | 9/1998 | Mogul |
| 5,805,911 | A | 9/1998 | Miller |
| 5,845,300 | A | 12/1998 | Comer et al. |
| 5,928,335 | A | 7/1999 | Morita |
| 6,003,085 | A | 12/1999 | Ratner et al. |
| 6,067,514 | A | 5/2000 | Chen |
| 6,092,100 | A | 7/2000 | Berstis et al. |
| 6,169,986 | B1 | 1/2001 | Bowman |
| 6,201,176 | B1 | 3/2001 | Yourlo |
| 6,208,339 | B1 | 3/2001 | Atlas et al. |
| 6,223,059 | B1 | 4/2001 | Haestrup |
| 6,247,043 | B1 | 6/2001 | Bates et al. |
| 6,278,992 | B1 | 8/2001 | Curtis et al. |
| 6,356,905 | B1 | 3/2002 | Gershman et al. |
| 6,377,965 | B1 | 4/2002 | Hachamovitch et al. |
| 6,430,558 | B1 | 8/2002 | Delano |
| 6,453,312 | B1 | 9/2002 | Goiffon et al. |
| 6,539,379 | B1 | 3/2003 | Vora et al. |
| 6,564,213 | B1 | 5/2003 | Ortega et al. |
| 6,571,282 | B1 | 5/2003 | Bowman-Amuah |
| 6,671,681 | B1 * | 12/2003 | Emens et al. ............... 707/706 |
| 6,751,603 | B1 | 6/2004 | Bauer et al. |
| 6,772,194 | B1 | 8/2004 | Goldschmidt |
| 6,829,607 | B1 | 12/2004 | Tafoya et al. |
| 6,847,959 | B1 | 1/2005 | Arrouye et al. |
| 6,993,723 | B1 | 1/2006 | Danielsen et al. |
| 7,039,635 | B1 | 5/2006 | Morgan |
| 7,130,843 | B2 | 10/2006 | Stockton |
| 7,185,271 | B2 | 2/2007 | Lee |
| 7,240,045 | B1 * | 7/2007 | Bushee ............................ 1/1 |
| 7,383,299 | B1 | 6/2008 | Hailpern et al. |
| 7,424,510 | B2 * | 9/2008 | Gross et al. ............... 709/203 |
| 7,647,225 | B2 * | 1/2010 | Bennett et al. ............ 704/251 |
| 7,672,932 | B2 | 3/2010 | Hood |
| 7,676,517 | B2 | 3/2010 | Hurst-Hiller |
| 7,788,248 | B2 | 8/2010 | Forstall |
| 7,836,044 | B2 | 11/2010 | Kamvar |
| 7,840,589 | B1 * | 11/2010 | Holt et al. ................... 707/769 |
| 7,890,526 | B1 | 2/2011 | Brewer |
| 2001/0013038 | A1 | 8/2001 | Purcell |
| 2002/0010739 | A1 | 1/2002 | Ferris et al. |
| 2002/0049756 | A1 | 4/2002 | Chua et al. |
| 2002/0055981 | A1 | 5/2002 | Spaey et al. |
| 2002/0065879 | A1 | 5/2002 | Ambrose et al. |
| 2002/0083182 | A1 | 6/2002 | Alvarado et al. |
| 2002/0087514 | A1 | 7/2002 | Payne et al. |
| 2002/0123994 | A1 | 9/2002 | Schabes et al. |
| 2002/0129012 | A1 | 9/2002 | Green |
| 2002/0138640 | A1 * | 9/2002 | Raz et al. .................... 709/231 |
| 2003/0041147 | A1 | 2/2003 | van den Oord et al. |
| 2003/0050959 | A1 | 3/2003 | Faybishenko et al. |
| 2003/0195876 | A1 | 10/2003 | Hughes et al. |
| 2004/0039988 | A1 | 2/2004 | Lee et al. |
| 2004/0117439 | A1 | 6/2004 | Levett et al. |
| 2004/0139396 | A1 | 7/2004 | Gelernter et al. |
| 2004/0148375 | A1 | 7/2004 | Levett et al. |
| 2005/0268334 | A1 | 12/2005 | Hesselink et al. |
| 2006/0075120 | A1 | 4/2006 | Smit |
| 2006/0129906 | A1 | 6/2006 | Wall |
| 2006/0184546 | A1 | 8/2006 | Yano et al. |
| 2006/0242109 | A1 | 10/2006 | Pereira et al. |
| 2007/0033176 | A1 | 2/2007 | Enns |
| 2007/0288648 | A1 * | 12/2007 | Mehanna et al. ........... 709/231 |
| 2008/0147788 | A1 * | 6/2008 | Omoigui ..................... 709/203 |

FOREIGN PATENT DOCUMENTS

| | | |
|---|---|---|
| WO | WO01/80079 | 10/2001 |
| WO | WO02/057951 | 7/2002 |

OTHER PUBLICATIONS

Nareddy, Krishna, "Introduction to Microsoft Index Server," Oct. 15, 1997, Microsoft Corporation, http://msdn.microsoft.com/en-us/libarry/ms951563(printer).aspx, 9 pages.

Harless, Rachele, Membership Database on USA Gymnastics Online, 1996, USA Gymnastics Online, http://www.usa-gymnastics.org/publications/technique/1996/9/membership-query.html, 5 pages.

Unknown, "Real-time data visualization, interaction and integration," http://www.altio.com> [retrieved on Jul. 24, 2007].

Google, "Google Suggest," http://www.labs.google.com/suggestfaq.html> [retrieved on Jul. 24, 2007].

Google, "Geeking With Greg: Exploring the future of personalized information," http//www.glinden.blogspot.com/2004/12/google-suggest.html> [retrieved on Jul. 24, 2007].

Unknown, "Wiki Blog LiveSearch," http//www.wiki.flux-cms.org/display/BLOG/LiveSearch> [retrieved on Jul. 24, 2007].

European Search Report dated Oct. 10, 2006 in re Application No. 05256651.0.

Anonymous, "Using the XML HTTP Request Object" [Online] Apr. 2002, XP-002401063, http://www.jibbering.com/2002/4/httprequest.2002.html> [retrieved on Sep. 28, 2006].

Anonymous, "Ajax (Programming)," Wikipedia.org, [online] Sep. 27, 2006, XP-002401064, http://en.wikipedia.org/wiki/Ajax.sub.--(programming)> [retrieved on Sep. 28, 2006].

MasterObjects, Inc., "Introducing QuestObjects," 2006, XP002496891, http://questobjects.masterobjects.com/documents/go-introducing.pdf, 25 pages.

European Search Report dated Oct. 14, 2008 in connection with European Application No. 08252534.6-1225, 9 pages.

European Examination Report dated Jul. 2, 2008 in connection with European Application No. 02763441.9, 4 pages.

European Search Report dated Mar. 27, 2008 in connection with European Application No. 02763441.9, 3 pages.

United States Office Action dated Aug. 19, 2009 in connection with U.S. Appl. No. 09/933,493, 34 pages.

United States Office Action dated Feb. 20, 2008 in connection with U.S. Appl. No. 09/933,493, 25 pages.

United States Office Action dated Nov. 13, 2008 in connection with U.S. Appl. No. 09/933,493, 39 pages3.

United States Office Action dated Jul. 25, 2007 in connection with U.S. Appl. No. 09/933,493, 16 pages.

United States Office Action dated Dec. 4, 2006 in connection with U.S. Appl. No. 09/933,493, 15 pages.

United States Office Action dated Mar. 9, 2006 in connection with U.S. Appl. No. 09/933,493, 12 pages.

United States Office Action dated Jun. 17, 2005 in connection with U.S. Appl. No. 09/933,493, 14 pages.

United States Office Action dated Oct. 21, 2004 in connection with U.S. Appl. No. 09/933,493, 15 pages.

United States Office Action mailed Mar. 31, 2010 in connection with U.S. Appl. No. 09/933,493, 34 pages.

European Examination Report dated May 25, 2007 in connection with European Application No. 05256651, 9 pages.

International Search Report dated Nov. 5, 2002 in connection with PCT Application No. PCT/US02/25729, 3 pages.

United States Office Action mailed Dec. 28, 2010 in connection with U.S. Appl. No. 09/933,493, 30 pages.

Marsch, Jürgen, "Remote Scripting" [Online] Jun. 15, 2000, XP002401062 (English translation). http://www.microsoft.com/germany/msdn/library/web/RemoteScripting.mspx?pf-=true> [retrieved on Sep. 28, 2006].

Marsch, Jürgen, "Remote Scripting" [Online] Jun. 15, 2000, XP002401062 (original version). http://www.microsoft.com/germany/msdn/library/web/RemoteScripting.mspx?pf-=true> [retrieved on Sep. 28, 2006].

* cited by examiner

```
<script type="text/javascript" language="javascript"
        src="qo-common.js"></script>

<script type="text/javascript" language="javascript"
        src="scripts/qo-questlet.js"></script>

<script type="text/javascript" language="javascript">

<!-
    var config = {};
    config.connectString   ="/qo-server";
    config.contentChannel  ="artist-name";
    config.postString      ="/your-application";
    config.helpLink        = "http://www.questobjects.com/";
    config.helpTarget      ="help";
    config.helpParameters  ="top=30,left=30,width=760,height=560";
    config.questFieldName  ="ArtistField";
    config.questFieldFile  ="qo-autocomplete-questfield.swf";
    config.questFieldWidth =250;
    config.questFieldHeight =20;
    config.popUpFile       ="qo-autocomplete-popup.swf";
    config.popUpWidth      =350;
    config.popUpHeight     =(14*17)+4;
    config.popUpToLeft     =false;
    config.bgColor         ="#FFFFFF";
    qoInsertPopUpQuestField (config);

//->
</script>
```

FIG. 12  ~370

Management
- Management
- Management (Financial)
- Management (Retail)
- Manufacturing
- Marketing and Advertising Clutch Cross Shaft ($60)
- Clutch Fork ($99)
- Clutch Fork Boot ($8)
- Fork Pilot Pine ($3)
- Fork Push Rod ($33)
- Hole Plug - Auto ($2)
- Pedal ($75)

Detroit-Asheville, NC
- Detroit-Asheville, NC
- Detroit-Halifax, Nova Scotia
- Detroit-Kitchener-Waterloo, On
- Detroit-New York, Stewart Airpo
- Detroit-Northwest Arkansas Regi
- Detroit-Rochester, NY

QUESTFIELD PROPERTIES

| QuestField Type | AutoLookup QuestField | AutoLookup QuestField | AutoSearch QuestField | Relational QuestField | FreeForm QuestField | Background QuestField |
|---|---|---|---|---|---|---|
| Relationship to data | One-to-one | One-to-many | Unrelated | Many-to-many | Many-to-many | Any |
| Number of results | 1 | Known | Unknown | Known | Known | Any |
| Listing | None | Alphabetized | Ranked | Custom | Optional | NA |
| Autocomplete | Optional | Full input | Last word (Optional) | Optional | Last word (Optional) | NA |
| Popup list | No | Yes | Yes | Optional | Optional | NA |
| Inputs | 1 | 2 | 1 | Multiple | 1 | Programmable |
| Content channels | 1 | 1 | 1 | Multiple | 1 or more | 1 |
| Simultaneous queries | 1 | 1 | 1 | Multiple | Multiple | Any |
| Dependency target | Yes | Yes | Yes | Optional | No | Programmable |

SYSTEM AND METHOD FOR UTILIZING ASYNCHRONOUS CLIENT SERVER COMMUNICATION OBJECTS

CLAIM OF PRIORITY AND CROSS-REFERENCE TO RELATED APPLICATIONS

This application is a continuation of U.S. patent application Ser. No. 11/257,912, entitled "SYSTEM AND METHOD FOR UTILIZING ASYNCHRONOUS CLIENT SERVER COMMUNICATION OBJECTS" filed Oct. 25, 2005, now U.S. Pat. No. 7,752,326, which is a continuation-in-part of U.S. patent application Ser. No. 09/933,493, entitled "SYSTEM AND METHOD FOR ASYNCHRONOUS CLIENT SERVER SESSION COMMUNICATION", filed Aug. 20, 2001, and which also claims the benefit of priority to U.S. Provisional Patent Application Ser. No. 60/622,907, entitled "SYSTEM AND METHOD FOR UTILIZING ASYNCHRONOUS CLIENT SERVER COMMUNICATION OBJECTS", filed Oct. 28, 2004; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to client-server communication systems, and particularly to systems and methods for utilizing asynchronous client server communication objects for interactive database searching, data entry, online purchasing, and other applications.

BACKGROUND

The world has moved to embrace the Internet. In fact, the Internet has become a world of its own: a world of information, a world of marketing, a world in which virtually anything can be brought to anyone, anywhere. If the Internet is a world in itself, then intranets are enterprises in themselves. Knowledge and domain components—from purchasing orders, insurance policies and tax returns to shoes, chainsaws and paper clips, as well as customers, employees, and infrastructure—everything is available through Web applications, or soon will be. The Internet offers an enormous connectivity advantage: the ability to maintain information and business rules in one place, accessible by anyone we wish it to be accessible to.

Like most modern software applications, browser-based applications typically use a client that runs in a web browser or on a handheld wireless device, a server that provides a centralized application that centrally manages application data and the business logic, and a protocol that governs the communications between the client and the server. However, applications designed for the Internet are far more primitive and far less powerful than LAN-based client/server applications because web browsers must work on as many platforms and systems as possible, and because the protocols that made the Internet a worldwide success were, by design, limited in features. As such, missing from Web applications are manageable windows, multiple document interfaces, drag-and-drop, in-line editing, automatic completions, different views on the same data, updating while typing or selecting, automatic spell checking, intelligent lookups, instant calculations, and many other powerful interactive end user tools that are now standard features on personal computers and workstations everywhere. Typically, users have to press Submit, Search, Continue, Next, or a similar button for their input to have any effect, often resulting in a completely new page loading into their browser. As Web applications attempt to handle increasingly complex business data, users find themselves filling in huge forms, then being notified about typos or incompleteness only after pressing Submit.

To address the deficiencies and limitations of the web browser, a new class of client technologies has emerged. These technologies enable developers to create "rich" Internet applications (RIAs). RIAs are friendly, data-driven applications that run in web browsers and other "thin" client environments, providing advanced UI features that significantly enhance the browser user's experience.

RIAs can be developed using frameworks and technologies based on several popular platforms, including Macromedia Flash, Sun Java, Microsoft ASP.NET, DHTML (Dynamic HTML), JavaScript, HTML, Extensible Markup Language (XML), cascading style sheets (CSS), the Document Object Model (DOM), and the Microsoft XMLHTTPRequest object.

What, then, are users missing, from an interaction perspective, in current Web pages? It is not the mouse, which is an intrinsic part of any Web experience and is often the only device available to interact with a Web page. It is also not the WYSIWYG nature of modern GUI-based applications. HTML in itself is quite rich in formatting text, adding pictures, movies and everything else that make web pages appealing. HTML is designed primarily for the presentation of such information. However, because it must display this information using different browsers across a diverse range of platforms and systems, HTML offers only a simple user interface that is relatively primitive by modern server-based application standards. Consequently, Web applications are seriously handicapped when delivering interactive applications. Alternatives, such as replacing HTML pages by Java applets or full-page Flash applications, can enhance interaction but they have other disadvantages, which is a reason many companies tend to stick with HTML and JavaScript when moving their applications to the Web.

What users are primarily missing from their Internet or online environment is feedback. Web applications cannot provide users with feedback, the essential element of intelligent interaction that users have come to expect from their personal computers and workstations. Web pages are relatively static. They cannot be automatically responsive to user input. Instead, users must push a Submit button and wait for the page to redraw before getting any useful feedback on the data they typed into a form. This is totally contrary to the user experience provided by today's stand-alone or client/server applications (e.g. Microsoft Word) where instantaneous feedback is a common and expected feature (e.g. highlighting of spelling mistakes).

The ability to provide immediate feedback on user actions would be advantageous in turning Web applications into interactive applications.

SUMMARY

As described herein, the QuestObjects system and method is a technology that adds interaction to Web applications.

Working hand-in-hand with HTML, the technology allows Web servers to act on string input on a per character basis, thus enabling intelligent auto completion and complex lookups using server side data. In short, the system enables interactive data-driven behavior based on incremental string input. For Web applications, this offers: Improved data entry speed and accuracy; Dramatically faster access to relevant data; Improved data security; and Improved user friendliness. In some implementations the system may also be used to provide dynamically focused suggestions to the user.

By enhancing rather than replacing HTML, the system enables server interaction and improves interface usability and responsiveness without changing the nature or look-and-feel of Web applications. This architecture allows services to easily and transparently blend in with current Web applications. Moreover, clients work with the vast majority of Internet browsers now in use—with no additional software for the end user to install. Additionally, as a standards-based Web service, the system functions seamlessly with modern Java-based, .Net, and other architectures, and imposes no restrictions on networks or firewalls.

BRIEF DESCRIPTION OF THE FIGURES

FIG. 12 shows a listing of a html and JavaScript code in accordance with an embodiment of the invention.

FIG. 33 shows an illustration of a QuestFields type in accordance with an embodiment of the invention.

FIG. 37 shows a table comparing different QuestField types in accordance with an embodiment of the invention.

DETAILED DESCRIPTION

Figure 1:
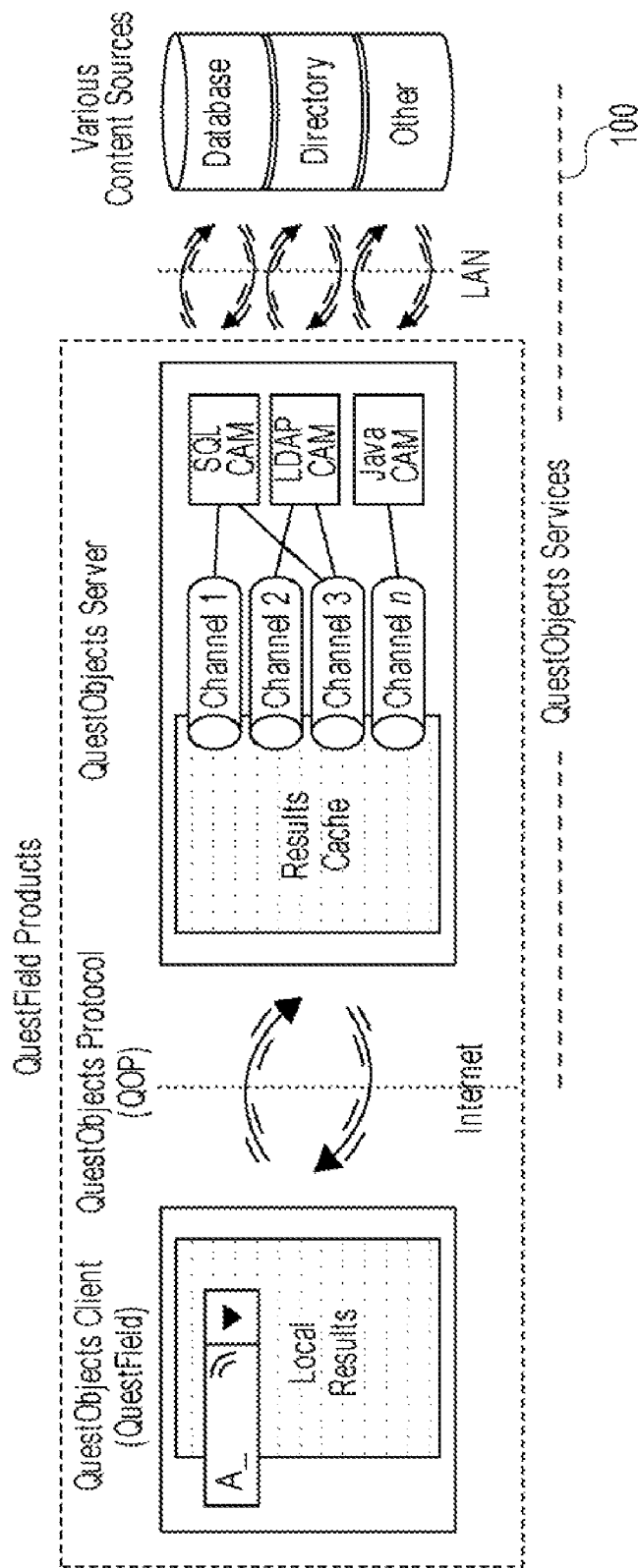
FIG. 1 shows an illustration of an example of a QuestObjects system and architecture in accordance with an embodiment of the invention.

As described herein, the QuestObjects system and method is a technology that adds interaction to Web applications. Working hand-in-hand with HTML, the technology allows Web servers to act on string input on a per character basis, thus enabling intelligent auto completion and complex lookups using server side data. In short, the system enables interactive data-driven behavior based on incremental string input. For Web applications, this offers: Improved data entry speed and accuracy; Dramatically faster access to relevant data; Improved data security; and Improved user friendliness. In some implementations the system may also be used to provide dynamically focused suggestions to the user.

By enhancing rather than replacing HTML, the system enables server interaction and improves interface usability and responsiveness without changing the nature or look-and-feel of Web applications. This architecture allows services to easily and transparently blend in with current Web applications. Moreover, clients work with the vast majority of Internet browsers now in use—with no additional software for the end user to install. Additionally, as a standards-based Web service, the system functions seamlessly with modern Java-based, .Net, and other architectures, and imposes no restrictions on networks or firewalls.

The system offers a highly effective solution to the aforementioned disadvantages of both client-server and Internet systems by providing a way to synchronize the data entered or displayed on a client system with the data on a server system. Data input by the client can be immediately transmitted to the server, at which time the server can immediately update the client display. To ensure scalability, systems built around the QuestObjects concept can be divided into multiple tiers, each tier being capable of caching data input and output. A plurality of servers can be used as a middle-tier to serve a large number of static or dynamic data sources, herein referred to as "content engines."

A variety of embodiments may be designed to suit a correspondingly wide variety of applications. As such the system offers a standardized way to access server data that allows immediate user-friendly data feedback based on user input. Data can also be presented to a client without user input, i.e. the data are automatically pushed to the client. This enables a client component to display the data immediately, or to transmit the data to another software program to be handled as required.

The system can also be used to simply and quickly retrieve up-to-date information from any string-based content source. Strings can be linked to metadata allowing user interface components to display corresponding information such as, for example, the meaning of dictionary words, the description of encyclopedia entries or pictures corresponding to a list of names.

Embodiments of the system can be used to create a user interface component that provides a sophisticated "auto-completion" or "type-ahead" function that is extremely useful when filling out forms. This is analogous to simple, client-side auto-complete functions that have been widely used throughout the computing world for many years. As a user inputs data into a field on a form, the auto-complete function analyzes the developing character string and makes intelligent suggestions about the intended data being provided. These suggestions change dynamically as the user types additional characters in the string. At any time, the user may stop typing characters and select the appropriate suggestion to auto-complete the field.

Today's client-side auto-complete functions are useful but very limited. The system, however, in its various embodiments, vastly expands the usefulness and capabilities of the auto-complete function by enabling the auto-complete data, logic and intelligence to reside on the server, thus taking advantage of server-side power. Unlike the client-side auto-complete functions in current use, an auto-complete function created by the system generates suggestions at the server as the user types in a character string. The suggestions may be buffered on a middle tier so that access to the content engine is minimized and speed is optimized.

The simple auto-complete schemes currently in popular use (such as email programs that auto-complete e-mail addresses, web browsers that auto-complete URLs, and cell phones that auto-complete names and telephone numbers) require that the data used to generate the suggestions be stored on the client. This substantially limits the flexibility, power, and speed of these schemes. Embodiments of the system, however, store and retrieve the auto-complete suggestions from databases on the server. Using the system, the suggestions generated by the server may, at the option of the application developer, be cached on the middle tier or on the client itself to maximize performance.

The system provides better protection of valuable data than traditional methods, because the data is not present on the client until the moment it is needed, and can be further protected with the use of user authentication, if necessary.

The system is also useful in those situations that require immediate data access, since no history of use needs to be built on the client before data is available. Indeed, data entered into an application by a user can automatically be made available to that user for auto-completion on any other computer, anywhere in the world.

Unlike existing data-retrieval applications, server data can be accessed through a single standardized protocol that can be built into programming languages, user interface components or web components. The system can be integrated into and combined with existing applications that access server data. Using content access modules, the system can access any type of content on any server.

In the detailed description below, embodiments of the present invention are described with reference to a particular embodiment named QuestObjects, created by the MasterObjects company. QuestObjects provides a system and method for managing client input, server queries, server responses and client output. One specific type of data that can be made available through the system from a single source (or syndicate of sources) is a QuestObjects Service. Other terms used to describe the QuestObjects system can be found in the glossary given below. It will be evident that the technology described herein may be utilized in other embodiments, and with other systems, in addition to the QuestObjects system.

FIG. 1 shows an example of the QuestObjects architecture 100. Generally described, QuestObjects is a powerful ultra-thin smart client/server technology used to create intelligent online data entry and retrieval applications called Quest-Fields. QuestFields, the products based on the QuestObjects technology, are deployed in web browser and handheld wireless device applications and enable up to millions of simultaneous users to have direct, virtually instantaneous access to enterprise data on remote content sources.

QuestFields compete primarily in the RIA market. However, unlike competitive products, a QuestField is an integrated "end-to-end" client-server solution that is more powerful, more universal and easier to deploy—all at a substantially lower cost than typical RIAs.

QuestFields are comprised of three integrated and highly optimized parts: the QuestObjects client, the QuestObjects Server, and the QuestObjects Protocol (QOP). The different parts of QuestFields can be distributed over multiple computers to provide load balancing and optimal performance.

The QuestObjects client typically comprises one or more QuestFields that enable each user to efficiently query remote content sources by providing a friendly but powerful user interface that communicates directly with the QuestObjects Server over the Internet. The QuestObjects Server easily handles many simultaneous user sessions and provides the interface to the underlying content sources (such as databases, directories, or search engines). The QuestObjects Server enables administrators to easily configure any number of content channels, each of which queries one of potentially many content sources that are typically present on a remote local area network (LAN).

Advantages of the QuestFields

Compared to existing RIA client technologies, QuestObjects-based products offer several important advantages, including: Far better performance; Proven functionality in large-scale corporate environments; No rewriting of existing web application code or redesign of web page layout; Compatibility with more than 99% of web browsers currently in use; Substantially faster implementation time; and Substantially lower implementation and maintenance cost.

QuestFields are designed to be compatible with virtually all "thin" client platforms. QuestField products can be designed to look like a "combo box" input field, that are used primarily in web browsers. However, future QuestFields can come in many more shapes, sizes, types and uses. Unlike other RIA technologies, QuestFields are truly universal because they can be developed in virtually any programming language that is supported by web browsers. Consequently, QuestFields will always be able to take advantage of the best available client technologies, even those yet to be developed.

Advantages of the QuestObjects Server

The QuestObjects Server competes with custom web application development environments, dedicated Web Services, groupware, and connectivity products that also provide a means to access content sources from within the browser. The QuestObjects Server has several advantages over competing server products, including: Easily configurable "black box" application requiring no programming and virtually no maintenance; Enables users to retrieve information from virtually any content source without the need to develop and maintain a custom application or Web Service; Provides a highly optimized service that enables many simultaneous users to access content with minimal impact on the customer's network or content engines; Usable in a far broader market than other groupware and connectivity products that typically replace full applications; Significantly enhances other, more complex, web applications, groupware, and connectivity products; and Runs 24/7, automatically connects to redundant content sources, and requires virtually no systems management.

Advantages of the QuestObjects Protocol

The QuestField and the QuestObjects Server communicate with each other using the QuestObjects Protocol (QOP). QOP is a standards-compliant communications protocol fully compatible with Service Oriented Architectures (SOA). SOA is an architectural approach that segments and isolates application functionality into smaller, discrete and usable components, otherwise known as "services." The primary goal of a SOA is developing application functions that are reusable and standardized so that once created they can be leveraged across multiple projects. This approach greatly reduces time, effort and cost of incorporating new functionality and extending existing applications. The QuestObjects technology enables organizations to do precisely that and to do it simply, quickly, and easily.

QOP uses the same transport mechanism that is used by standard web pages: HTTP over TCP/IP. As with all modern SOAs, this allows QOP to transparently communicate over the Internet without imposing unusual requirements on routers and firewalls. By contrast, legacy application protocols typically rely on dedicated ports and required specialized drivers to be installed on client and server.

QuestObjects Server

In accordance with an embodiment, the QuestObjects Server is an application that runs in a standard Java Servlet Container, compatible with open-source and commercial Java application servers that are used in enterprises throughout the world. A QuestObjects Server provides its QuestObjects Services through content channels. Each content channel returns a specific kind of data from a specific back-end content source. For handling different kinds of back-end data, the QuestObjects Server enables the use of multiple Content Access Modules (CAMs) that each provide a means to communicate with a specific kind of content engine on the content source, such as SQL, LDAP, or a proprietary legacy database. QuestObjects Server features include:

Request Management—The QuestObjects Server manages the load of incoming client requests and queries to the content source. Request management enables the server to scale to very large numbers of users and queries.

User Session Management—The QuestObjects Server provides efficient metering and auditing by using the data in each user's session to keep track of the queries a user performs and the results that have been sent back.

Unified Query Cache—The QuestObjects Server caches query results in a cache that is common to all users, thus improving performance on recurring queries and limiting the load imposed on content engines.

Unlimited Content Sources—The QuestObjects Server can query one or more content sources. Support for both SQL databases and LDAP directories is built-in, and a modular Java interface provides a simple API that enables MasterObjects and its customers to easily and quickly create custom interfaces to legacy data.

Query Merging—Without requiring any additional programming, a QuestObjects content channel can perform one or more queries on the back-end database or directory and intelligently combine their results into a single results list. This makes it very easy to implement QuestFields that enable users to perform queries in alternate ways, such as looking up a person by first name, last name, email address, or any combination thereof. A single content channel can even combine results from multiple different content sources.

QuestObjects Protocol (QOP)

In accordance with an embodiment, to enable the QuestObjects technology to communicate efficiently over the Internet, a protocol, called the QuestObjects Protocol (QOP), is used for communication between large numbers of simultaneous QuestField users and any number of QuestObjects Servers. QOP uses the very same network infrastructure that is used by standard web pages. This means that if a web page loads correctly into the browser, QOP works as well. Consequently, neither users nor administrators need to worry about the details of the communication protocol. In accordance with an embodiment, QOP client-server messaging is based on web standards. The application-layer protocol is based on XML wrapped in optional SOAP envelopes using HTTP(S) as the transport layer. QOP does not require the use of cookies in the browser and is designed to be compliant with existing Internet and security standards.

Security

QOP can be configured to run over Secure Sockets Layer (SSL) for complete security of user queries and data received from the server. Either the entire web page or individual QuestField queries can be securely encrypted. This means that a web page using QuestFields can load very quickly by keeping its images unencrypted, yet still fully securing content that appears in its QuestFields.

Load Balancing

The QuestObjects technology is specifically designed for large intranet and Internet applications. The QuestObjects Server, QuestObjects Service and/or the content source can reside simultaneously on multiple machines, permitting load balancing and capacity expansion simply by adding more hardware. A QuestObjects Server uses "sticky" session connections so that a client can logically connect to any server machine in the system. Once a session is established, all communications from the client IP address go to and from the same server.

QuestObjects Services

In accordance with an embodiment, each QuestObjects Server can be configured to provide QuestObjects Services that are available to users of independent websites. This makes virtually any content that is available on the Internet accessible to QuestFields. QuestObjects Services can be provided from Internet domains other than the domain that serves the web pages. Thus, QuestField users can subscribe to multiple QuestObjects Services that are hosted by different providers on the Internet. To manage these services, the QuestObjects technology uses Syndicators, which offer content provided through QuestObjects Servers. Syndicators offer subscription-based access to specific content channels to managed user groups, enabling the QuestObjects Server to automatically collect usage statistics and provide billing information for commercial use of the service.

GLOSSARY

AutoComplete QuestField

A type of QuestField that closely resembles the "combo box" of traditional applications, whereby user entry is automatically completed, and multiple results can be displayed in a popup list.

AutoLookup QuestField

The simplest type of QuestField, which performs a direct lookup based on the user's input and displays the corresponding single result.

AutoSearch QuestField

A type of QuestField that is used to enter user queries (such as Boolean) and to display corresponding results in a filtered and ranked result list.

Background QuestField

A type of QuestField that has no user interface, but rather is integrated into an application where it runs in the background accessing data from QuestObjects Services.

CAM

See Content Access Module.

CSS

Cascading Style Sheets (CSS) is a style sheet language used to describe the presentation of a document written in HTML (or other markup languages). It allows the "look" of a web page to be modified without changing the underlying HTML or web application, and thus separates the "presentation logic" from the "application logic" and business rules. An embodiment of the invention takes advantage of CSS to enable customers to change the "look" of QuestFields so they "blend in" to their own web pages. Customers can easily modify the colors and widths of QuestField borders, as well as the images used for QuestField buttons.

Content Access Module

A Content Access Module (CAM) provides a standardized mechanism to link the QuestObjects system to a specific type of content engine. A CAM is the "middleware" between the QuestObjects system and the data it accesses. QuestObjects currently includes CAMs that communicate with any JDBC-compliant database or any LDAP-compliant directory server, as well as a Java CAM that allows customers to easily integrate the QuestObjects Server with their legacy or proprietary databases by using a powerful yet simple open Java API.

Content Channel

A configuration on the QuestObjects Server that defines a specific method of querying one or more specific content sources, allowing QuestFields users to perform queries and retrieve corresponding results. A content channel accesses one or more content engines, each through a specific Content Access Module. A single content channel can be configured to perform multiple queries to retrieve data from the content sources, whereby the QuestObjects Server merges the results from these "sub queries" into a single result set for the QuestField user. For example, in a PeopleFinder application the content channel can be configured to query the underlying content engine by last name, first name, email address, and any combination thereof. The QuestField user receives a consolidated list of person names that were returned by any of the sub queries in the content channel.

Content Engine

A content engine is a third-party application that runs on the content source that is capable of performing string-based queries and returning string-formatted answers to the QuestObjects system. Examples include relational databases, corporate directories, and search engines. A simple content engine could read information directly from a file, or could perform a query to access a Web Service over the Internet. The QuestObjects Server simultaneously accesses different content engine types through Content Access Modules.

Content Source

A server computer that provides the data that is accessed by the QuestObjects system. The content source makes its data available through a content engine. For best performance, the content source must be located on the same LAN as the QuestObjects Server, and could even be hosted on the very same server computer. The QuestObjects Server can be linked to any number of content sources. To retrieve specific information from the content source, one or more content channels are configured on the QuestObjects Server.

DHTML QuestField

A version of QuestField that is based on DHTML technology. DHTML enables the QuestField to run in modern web browsers without requiring Flash or other plug-in technology. QuestObjects technology enables QuestFields to detect the browser, and to automatically activate the appropriate QuestField for each individual user. Future QuestFields may be built using alternative client technologies, such as J2ME.

ECMAScript

See JavaScript.

Flash

Multimedia authoring program and a corresponding runtime environment called the Macromedia Flash Player, written and distributed by Macromedia, that utilizes vector and raster graphics, program code and bidirectional streaming video and audio. Strictly speaking, Macromedia Flash is the authoring environment and Flash Player is the virtual machine application used to run the Flash files, but in colloquial language these have become mixed: "Flash" can mean either the authoring environment, the player or the application files. The Flash files, which usually have an SWF file extension, may appear in a web page for viewing in a web browser, or standalone Flash players may "play" them. Flash files occur most often as animations or design elements on web pages, and more recently Rich Internet Applications. They are also widely used in web advertisements, due to the fact that a flash file can contain much more information than a GIF or JPEG file of the same size.

Flash QuestField

A version of QuestField that is based on Flash technology, allowing it to run in any browser that has the Flash Player installed.

FreeForm QuestField

A type of QuestField that consists of a large text area and provides data management services such as remote spell checking and auto-save.

HTTP
    HTTP (Hypertext Transfer Protocol) is the set of rules for transferring files (text, graphic images, sound, video, and other multimedia files) using the Internet protocol (TCP/IP) on the World Wide Web.
HTTPS
    HTTPS (HTTP over SSL) is an extension to HTTP that provides security by encrypting and decrypting user page requests as well as the pages that are returned by the web server.
Java
    Java is an object-oriented programming language developed by Sun Microsystems. Specifications of the Java language, the JVM (Java Virtual Machine) and the Java API are community-maintained through the Sun-managed Java Community Process.
Applets
    Small applications written in Java that run in any web browser that supports a JVM (Java Virtual Machine). Client-side Java applications and Java applets have never become a predominant client technology.
JavaScript
    Object-based scripting programming language that is built into web browsers, also known as ECMAScript after the standards body that now governs the language. JavaScript is best known for its use in websites, but is also used to enable scripting access to objects embedded in other applications.
Java Servlet Container
    Part of Java application servers such as IBM WebSphere, BEA WebLogic, and Apache Tomcat that allows multiple Servlet-based applications to be hosted on a web server. A servlet container controls the servlets that are deployed within the web server, and is responsible for forwarding the requests and responses for them. It has the functionality of mapping a URL to a particular servlet and of ensuring that the process requesting the URL has the correct access rights.
JDBC
    Java Database Connectivity, or JDBC, is an API for the Java programming language that defines how a client may access a database. It provides methods for querying and updating data in a database. JDBC is oriented towards relational databases that use SQL. An embodiment of the invention includes a Content Access Module that allows QuestObjects to query databases through JDBC. JDBC is supported by virtually all commercial and open-source SQL databases including Oracle, IBM DB2, Microsoft SQL Server, MySQL, etc.
J2ME
    Acronym for Java 2 Platform, Micro Edition (recently renamed by Sun to Java ME, but still most often referred to as J2ME), a collection of Java APIs targeting embedded products such as PDAs, cell phones and other consumer appliances. J2ME has become a popular option for creating games for cell phones, as they can be emulated on a PC during the development stage and easily uploaded to the phone.
JVM
    Acronym for Java Virtual Machine. All applications that were built in Java run in a JVM, which is available for virtually all operating systems and embedded devices.
LDAP
    The Lightweight Directory Access Protocol, or LDAP, defines a relatively simple and efficient protocol for updating and searching directories running over the Internet protocol, TCP/IP. It is in common use in enterprises worldwide. Virtually all commercial and open-source directory servers use LDAP, allowing applications to access directory information in a standardized way, similar to the way in which JDBC provides a way to access SQL databases. An embodiment of the invention includes a Content Access Module that allows QuestObjects to query directories through LDAP.
PeopleFinder QuestField
    Product name used for a specific kind of AutoComplete QuestField: Configured to access a content channel that retrieves personnel records, enabling users to use their web browser to quickly find names, addresses, phone numbers, etc. in a corporate directory or personnel database without leaving the HTML page they are on.
QOP
    See QuestObjects Protocol.
QuestField
    A user interface element in a browser-based "Rich Internet Application" that sends queries to, and receives results from the QuestObjects Server. Forms the client part of the QuestObjects technology. Six different types of QuestFields are envisioned: AutoLookup, AutoComplete, AutoSearch, Relational, FreeForm, and Background.
QuestObjects Enterprise Server
    Commercial name for the QuestObjects Server product that is optimized and licensed for use in a closed intranet setting, where the total number of users is known.
QuestObjects Protocol
    The QuestField and the QuestObjects Server communicate with each other using the QuestObjects Protocol (QOP). QOP is a standards-compliant communications protocol that fits well into Service Oriented Architectures (SOA). It is based on small XML-formatted data packages that are exchanged over the Internet using HTTP.
QuestObjects Server
    A Java server application that implements the server part of the QuestObjects product. It communicates with the QuestObjects Client (QuestFields) through the QuestObjects Protocol, and communicates with one or more content engines through Content Access Modules.
QuestObjects Service
    A logical name for one or more content channels that provide a valuable service for QuestField users on the Internet. A QuestObjects-specific Web Service.
Relational QuestField
    A type of QuestField that provides multiple inputs to the user allowing navigation through complex relational data structures configured in multiple content channels.
Service Oriented Architectures
    SOA is an architectural approach that segments and isolates application functionality into smaller, discrete and usable components, otherwise known as Web Services. The primary goal of a SOA is developing application functions that are reusable and standardized so that once created they can be leveraged across multiple projects. This approach greatly reduces time, effort and cost of incorporating new functionality and extending existing applications. The QuestObjects technology enables organizations to do precisely that and to do it simply, quickly, and easily.
Servlet
    A servlet is an object in a Java server application that receives requests and generates a response based on each request. The QuestObjects Server implements servlets to perform these basic yet essential tasks, leveraging standard Java Servlet Container technology for optimal performance and full compatibility with other server technologies in common use. See Java Servlet Container.
Site Search QuestField
    An AutoSearch QuestField that is customized and optimized for performing web searches. Site Search QuestFields access a content channel that performs queries on the full-text index of one or more websites, as well as databases used by dynamic websites.

Site Search Service

A QuestObjects Service that is accessed by Site Search QuestFields.

SOA

See Service Oriented Architectures.

SOAP

Simple Object Access Protocol (SOAP) provides a standardized structure for XML-based information used for exchanging structured and typed information between peers in a decentralized, distributed environment. It is most commonly used to package XML-formatted data that is exchanged in Service Oriented Architectures.

SQL

Structured Query Language (SQL, often pronounced as "sequel") is the most popular computer language used to create, modify and retrieve data from relational database management systems. It is in common use in enterprises worldwide. Virtually all commercial and open-source databases use SQL, allowing applications to access database information in a standardized way, similar to the way in which LDAP provides a way to access corporate directories. An embodiment of the invention includes a SQL Content Access Module that allows QuestObjects to query databases through JDBC.

SSL

The Secure Sockets Layer (SSL) is a commonly used protocol for managing the security of message transmission on the Internet.

Syndicator

A logical component in QuestObjects Server that manages a group of content channels for a group of users. A Syndicator manages user access privileges through subscriptions to one or more content channels, performs metering, and can be used as a source for billing information.

Web Service

A Web Service is a collection of protocols and standards used for exchanging data between applications or systems that implement a Service Oriented Architecture. Software applications written in various programming languages and running on various platforms can use Web Services to exchange data over computer networks like the Internet in a manner similar to inter-process communication on a single computer. This interoperability is due to the use of open standards.

Embodiments of the present invention provide a system and a method that allows clients or client applications to asynchronously retrieve database information from a remote server or server application. The terms "client" and "server" are used herein to reflect specific embodiments of the invention, although it will be evident to one skilled in the art that the invention may be equally used with any implementation that requires communication between a first process or application and a second process or application, regardless of whether these processes comprise a typical client-server setup or not. The invention includes a Server, that handles requests for information from clients, and a communication protocol that is optimized for sending characters from a Client to the Server, and lists of strings from the Server to the Client. In one embodiment, as the Server receives a single character from the Client, it immediately analyzes the lengthening string of characters and, based on that analysis, returns database information to the Client in the form of a list of strings. Clients are not restricted to programs with a user interface. Generally, any process or mechanism that can send characters and receive string lists can be considered a client of the system. For example, in an industrial or power supply setting, the control system of a power plant could send sensor readings to the system, and in return receive lists of actions to be taken, based on those sensor readings.

The system's protocol is not restricted to sending single characters. In fact, Clients can also use the protocol to send a string of characters. For example, when a user replaces the contents of an entry field with a new string, the Client may then send the entire string all at once to the Server, instead of character by character.

In accordance with one embodiment of the invention the system is session-based, in that the server knows or recognizes when subsequent requests originate at the same Client. Thus, in responding to a character the Server receives from a Client it can use the history of data that has been sent to and from the current user. In one embodiment, the system stores user preferences with each Service, so that they are always available to the Client, (i.e., they are independent of the physical location of the client). Furthermore, client authentication and a billing system based on actual data and content use by Clients are supported. For faster response, the Server may predict input from the Client based on statistics and/or algorithms.

The system is bi-directional and asynchronous, in that both the Client and the Server can initiate communications at any moment in time. The functionality of the system is such that it can run in parallel with the normal operation of clients. Tasks that clients execute on the system are non-blocking, and clients may resume normal operation while the system is performing those tasks. For example, a communication initiated by the Client may be a single character that is sent to the Server, that responds by returning appropriate data. An example of a communication initiated by the Server is updating the information provided to the client. Because the system is session-based it can keep track of database information that has been sent to the Client. As information changes in the database, the Server sends an updated version of that information to the Client.

Embodiments of the system may be implemented as a multi-tier environment This makes it scalable because the individual tiers can be replicated as many times as necessary, while load balancing algorithms (including but not limited to random and round robin load-balancing) can be used to distribute the load over the copies of the tiers. One skilled in the art would appreciate that it is not necessary to replicate the tiers. Indeed, there may be only a single copy of each tier, and that all tiers (Client, Server, and Service) may be running on a single computer system.

Figure 2:
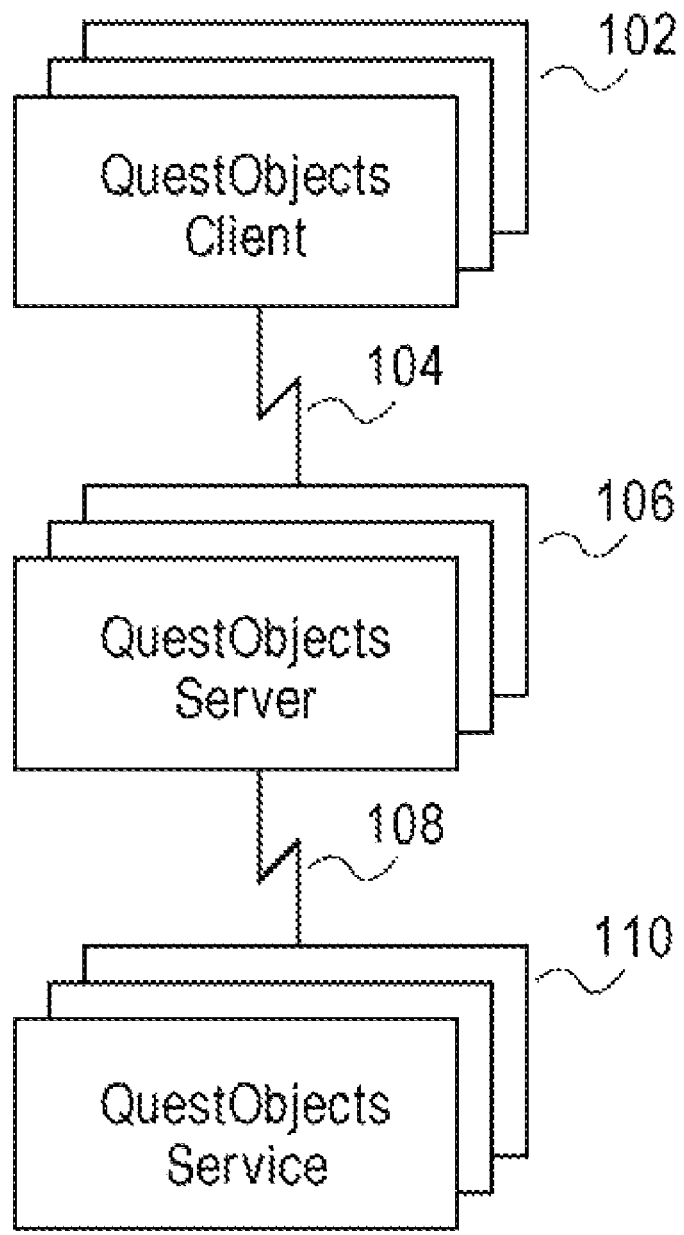
FIG. 2 shows an illustration of a system in accordance with an embodiment of the invention.

FIG. 2 illustrates one example of a system that embodies the present invention. As shown in FIG. 2 there may be various Clients 102 using the system. These Clients use a communication protocol 104 to send information, including but not limited to single characters, and to receive information, including but not limited to lists of strings and corresponding metadata. At least one Server 106 receives information from the Client, and sends information to the Client. In a typical embodiment if there is a plurality of Servers, then the system can be designed so that each Client connects to only one of them, which then relays connections to other Servers, possibly using load-balancing algorithms. Servers have a communication link 108 to a Service 110, which they use to obtain the information that they send to the Client.

Figure 3:
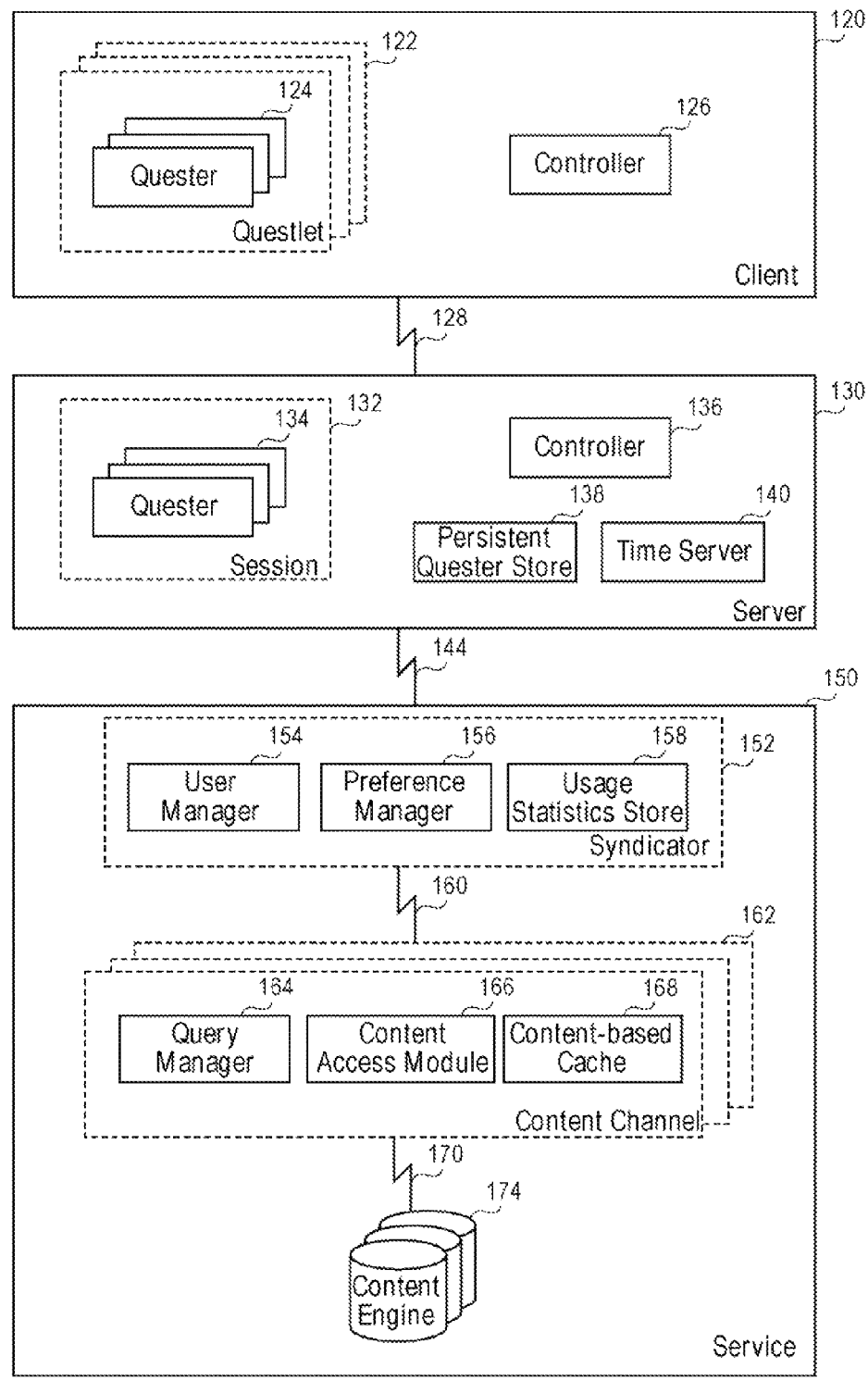
FIG. 3 shows an illustration of a system in accordance with an embodiment of the invention.

FIG. 3 is a schematic illustrating an embodiment of the present invention, and displays a five-tier system that has a user interface in which user interface elements use the present invention to assist the user in performing its tasks. For purposes of illustration, FIG. 3 displays just one session and one content Service. In an actual implementation there may be multiple concurrently active sessions, and there may be more than one content Service that Clients can use. As shown herein, the first of the five tiers is a Client tier 120. The Client tier contains the user interface and the Client components that are needed to use the system. The second tier is a Server or server process 130, which handles the queries that Clients execute, and in return displays results to the Client. Service 150, which corresponds to 110 of FIG. 2, is a logical entity comprising three more tiers: a Syndicator 152, a Content Channel 162 and a Content Engine 174. The Syndicator provides access to a number of Content Channels and performs accounting services based on actual data use. The Content Channel provides a specific type of information from a specific source (i.e. the Content Engine). The Content Engine is the actual source of any content that is made available through the QuestObjects system. The Client tier 120 corresponds to the client 102 in FIG. 2. In this example, the Client may be an application (and in some embodiments a web application) with a user interface that accesses the system of the present invention. As used in the context of this disclosure a user interface element that uses the present invention is referred to as a "Questlet." A Client can contain one or more Questlets 122 (e.g. an input field or a drop down list. A Questlet is always associated with at least one Client Quester 124. Questers are objects that tie a QuestObjects input buffer (containing input from the Client) to a QuestObjects Result Set returned from a QuestObjects Server. Questers exist on both the Client and Server, in which case they are referred to as a Client Quester and a Server Quester, respectively. Every Client Quester has one corresponding Server Quester. In accordance with the invention, any event or change that happens in either one of them is automatically duplicated to the other so that their states are always equal. This synchronization mechanism is fault-tolerant so that a failure in the communication link does not prevent the Questers from performing tasks for which they do not need to communicate. For example, a Client Quester can retrieve results from the cache, even if there is no communication link to the Server. Each single Quester accesses exactly one QuestObjects Service, i.e. one specific Content Channel offered by one specific Syndicator. At initialization of the Client, the Questlet tells its Quester which Service to access. In one embodiment a Service is stored or made available on only one Server within a network of Servers. However, this is transparent to the Client because each Server will forward requests to the right computer if necessary. The Client does not need to know the exact location of the Service.

To communicate with its Server Quester 134, each Quester in a session uses a controller 126. The system contains at least one Client Controller 126 and a Server Controller 136, which together implement the network communication protocol 128 of the present invention. Client Controllers may cache results received from a Server, thus eliminating the need for network traffic when results are reused.

Client Questers are managed by a Questlet, which create and destroy Questers they need. In a similar fashion, Server Questers are managed by a Session 132. When a Client Quester is created, it registers itself with the Client Controller. The Client controller forwards this registration information as a message to the Session using the Server Controller. The Session then checks if the Persistent Quester Store 138 contains a stored Quester belonging to the current user matching the requested Service and Query Qualifier. If such a Quester exists, it is restored from the Persistent Quester Store and used as the peer of the Client Quester. Otherwise, the Session creates a new Server Quester to be used as the Client Quester's peer.

A Time Server 140 provides a single source of timing information within the system. This is necessary, because the system itself may comprise multiple independent computer systems that may be set to a different time. Using a single-time source allows, for example, the expiration time of a Result Set to be calibrated to the Time Server so that all parts of the system determine validity of its data using the same time.

Server communication link 144 is used by the Server to send requests for information to a Service, and by a Service to return requested information. Requests for information are Query objects that are sent to and interpreted by a specific Service. Query objects contain at least a string used by the Service as a criterion for information to be retrieved, in addition to a specification of row numbers to be returned to the Client. For example, two subsequent queries may request "row numbers 1 through 5", and "6 through 10", respectively. A query object may also contain a Qualifier that is passed to the appropriate Service. This optional Qualifier contains attributes that are needed by the Service to execute the Query. Qualifier attributes may indicate a desired sort order or in the example of a thesaurus Service may contain a parameter indicating that the result list must contain broader terms of the Query string. Services use the communication link to send lists of strings (with their attributes and metadata) to Servers. Server communication link 144 is also used by Server Questers to store and retrieve user preferences from a Syndicator's Preference Manager.

Questers use Services to obtain content. A Service is one of the Content Channels managed by a Syndicator. When a Quester is initialized, it is notified by its QuestField (Active Component) of the Service it must use. The Service may require authentication, which is why the Syndicator provides a User Manager 154. If a Client allows the user to set preferences for the Service (or preferences needed by the QuestField), it may store those preferences using the Syndicator's Preference Manager 156. The Server (i.e. Server Quester) only uses the Syndicator for authentication and preferences. To obtain content, it accesses the appropriate Content Channel directly. The Content Channel uses its Syndicator to store usage data that can be later used for accounting and billing purposes. Usage data is stored in a Usage Statistics Store 158.

Content communication link 160 is used by Content Channels to send usage data to their Syndicator, and to retrieve user information from the Syndicator. The Content Channel is a layer between the QuestObjects System, and the actual content made available to the system by a Content Engine 174. Each Content Channel has a corresponding Query Manager 164 that specifies the type of query that can be sent to the corresponding Content Engine, and defines the types of data that can be returned by the Content Channel.

Specification of query type comprises a set of Query Patterns and Query Filters that are used by the Server Quester to validate a string before the string is sent to the Content Channel as a QuestObjects Query. For example, a query type "URL" may allow the Server Quester to check for the presence of a complete URL in the input string before the input string is sent to the Content Channel as a query. A query type "date" might check for the entry of a valid date before the query is forwarded to the Content Channel.

The Query Manager optionally defines the types of string data that can be returned to the Client by the Content Channel. Specific QuestFields at the Client can use this information to connect to Services that support specific types of data.

Examples of string types include: simple terms, definitional terms, relational terms, quotes, simple numbers, compound numbers, dates, URLs, e-mail addresses, preformatted phone numbers, and specified XML formatted data etc.

The Query Manager 164 retrieves database information through a Content Access Module 166. The Content Access Module is an abstraction layer between the Query Manager and a Content Engine. It is the only part of the system that knows how to access the Content Engine that is linked to the Content Channel. In this way, Query Managers can use a standardized API to access any Content Engine. To reduce information traffic between Content Channels and Content Engines, Content Channels may access a content-based cache 168 in which information that was previously retrieved from Content Engines is cached. Engine communication link 170 is used by Content Access Modules to communicate with Content Engines. The protocol used is the native protocol of the Content Engine. For example, if the Content Engine is an SQL based database system then the protocol used may be a series of SQL commands. The Content Access Module is responsible for connecting the Content Engine to the QuestObjects System.

Content Engines 174 are the primary source of information in the system. Content Engines can be located on any physical computer system, may be replicated to allow load balancing, and may be, for example, a database, algorithm or search engine from a third-party vendor. An example of such an algorithm is Soundex developed by Knuth. Content Engines may require user authentication, which, if required, is handled by the Syndicator (through the Content Access Module).

The invention uses Content Engines as a source of strings. One skilled in the art would understand that a string may, for example, contain a URL of, or a reference to any resource, including images and movies stored on a network or local drive. Furthermore, strings may have metadata associated with them. In one embodiment, strings might have a language code, creation date, modification date, etc. An entry in a dictionary may have metadata that relates to its pronunciation, a list of meanings and possible uses, synonyms, references, etc. A thesaurus term may have a scope note, its notation, its source and its UDC coding as metadata, for example. Metadata of an encyclopedia entry may include its description, references, and links to multi-media objects such as images and movies. A product database may have a product code, category, description, price, and currency as metadata. A stock quote may have metadata such as a symbol, a company name, the time of the quote, etc. Instructions to a control system may contain parameters of those instructions as metadata. For example, the instruction to open a valve can have as metadata how far it is to be opened.

Further details of an embodiment of the system are provided below, and also in copending U.S. patent application Ser. No. 09/933,493; published as U.S. Patent Publication No. 20030041147, entitled "SYSTEM AND METHOD FOR ASYNCHRONOUS CLIENT SERVER SESSION COMMUNICATION", filed Aug. 20, 2001, and incorporated herein by reference.

QuestField Products

The QuestObjects technology was designed to be compatible with any platform, including traditional client/server environments, but it is especially powerful for applications developed for use in web browsers and on handheld wireless devices (cell phones, PDAs, etc.). Products based on the QuestObjects technology, called QuestFields, have significant technological features and competitive advantages, many of which have never before been available for web browser applications. These include:

Easy Integration—QuestFields are very easily added to existing HTML pages. Contrary to other rich Internet technologies, QuestFields can be implemented in most web browser applications without changing the existing application's source code or web page design. Moreover, using standard CSS (cascading style sheets), the borders and buttons of a QuestField can easily be modified to reflect each customer's individual style.

Discrete Components—A QuestField is comprised of standardized components that can easily be combined and reused. In addition, multiple dependent QuestFields deployed on a single web page can automatically share the same user session.

Ultra-Thin—QuestFields have been designed as high performance, ultra-thin clients that nevertheless offer the user extremely high functionality and friendliness. By keeping track of session information on the QuestObjects Server, a QuestField effectively acts as an efficient, continuously updated "window" on server data.

Field Dependencies—QuestFields can have dependencies on each other's data, enabling data in one field to be automatically updated after a change in another field. Moreover, this can be accomplished without any additional client-side or server-side coding. Dependencies can be created between any content channels. Thus, a QuestField querying an SQL database can be dependent on the values of a QuestField linked to an LDAP directory.

Ubiquitous—QuestFields can use Macromedia's Flash Player, which is now installed on 98% of the computers connected to the Internet. This means that more than 500 million computers can use any Flash-based QuestObjects product without installing any additional software. Nevertheless, a DHTML QuestField is currently under development to ensure that QuestFields continue to offer the highest performance for the most users.

Interchangeable—QuestFields can be implemented in any programming language. By simultaneously supporting multiple client technologies and by dynamically selecting the appropriate technology for a specific application user, QuestFields can be used by virtually all Internet and intranet users—a much wider user reach than any other Rich Internet Application technology.

Support for Web Services

Embodiments of the system may utilize web services to provide some or all functionality. Web services are open standards-based functional components that allow applications to connect over the Internet on demand, using loose coupling. Today, Web services are the core IT strategies of the computer industry's leaders, including IBM, Microsoft, and Sun. To address today's business needs, applications have an ever-increasing need to work closely together. By their very nature, Web services offer interoperability across all platforms that implement a Web services stack, regardless of programming language or operating system. Web services support this in a standard, well-defined manner. Web services created using Sun's J2EE-based technologies are fully interoperable with Microsoft's .NET web services.

By definition, QuestObjects is a document-type Web service. MasterObjects has designed the product to be fully compliant to open standards.

QuestObjects System Implementation

As described herein, the QuestObjects implementation of the system is ideally suited for Intra-enterprise component reuse. QuestObjects enhances legacy applications, which often use proprietary connections to the database, by adding a second service-based mechanism to access the information. This can be done while maintaining current, proprietary invocation mechanisms. QuestObjects can also be used for Componentized E-Services (B2B), where information is provided through a QuestObjects Service on a subscription basis.

QuestObjects brings interaction to static Web pages. As a result, it enables Web applications to deliver to users, through a Web browser, much of the interactive richness of the user's typical personal computer or workstation. QuestObjects is a powerful yet simple concept that can be summed up in one sentence: "QuestObjects enables Web clients to interact with servers using string-based input on a per character basis."

Figure 4:
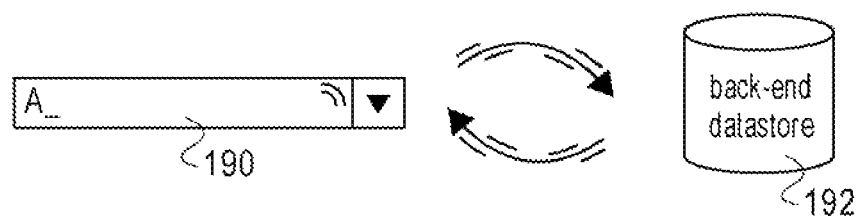
FIG. 4 shows an illustration of an asynchronous session-based search system including a front-end client search field and a back-end server datastore.

FIG. 4 shows an illustration of an asynchronous session-based search system including a front-end client search field 190 and a back-end server datastore 192. QuestObjects' power lies in its ability to leverage the textual nature of the Web. Text is the basis of everything users find on the Internet. Consequently, Web applications are all about string-based data. The primary purpose of the Web is to find information, but whether the user is looking for a book to buy, searching train schedules, browsing holiday brochures, gathering data on company customers or employees, or getting stock quotes, all of the data presented to the user by the Web is delivered in the form of text—including images which are represented, in text, by their URL. Working together, it is rather astonishing what HTML and Web browsers can accomplish just with text, but the final result still falls far short of the user's typical personal computer and workstation experience because there is no interaction and no automatic, instantaneous feedback. Instead, new information is presented only after the user enters some string-based data into a form, presses the Submit button, and waits for the Web page to analyze the input and redraw the entire page.

By contrast, today's powerful, non Web-based applications that are accessed directly by personal computers and workstations provide a vast array of instant help and feedback. Automatic type-aheads, selection lists, wiggly lines indicating spelling mistakes and other interactive features provide users with real-time feedback based on real data in some kind of data store. Efficiently and effectively, QuestObjects adds this same kind of instant feedback to regular Web pages by linking user actions to data stored anywhere on the Internet.

Providing instant feedback is a powerful enhancement to Web applications, but the QuestObjects technology offers more. Multiple fields containing dependent data can automatically update themselves when one or the other changes. QuestObjects collects statistics, provides user histories, and allows accurate accounting of data returned to the user. QuestObjects does all this easily and transparently. Depending on the implementation, the product is no more than a black box between the user and content located anywhere on the Internet.

QuestObjects Architecture

QuestFields—QuestObjects enables dynamic interaction between client-side UI elements and back-end data. These enabled UI elements are called QuestFields. QuestFields are connected to a data source through a Content Channel.

Figure 5:
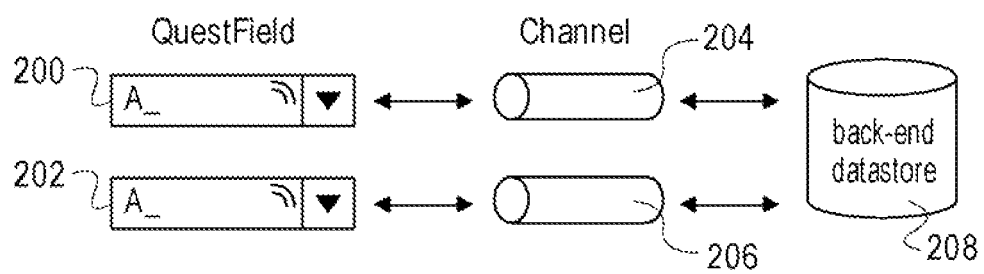
FIG. 5 shows an illustration of an asynchronous session-based search system including multiple front-end client search fields, multiple channels, and a back-end server datastore.

FIG. 5 shows an illustration of an asynchronous session-based search system including multiple front-end client search fields 200, 202, multiple channels 204, 206, and a back-end server datastore 208.

Questlets—QuestFields live within a lightweight application called a Questlet. A typical Questlet is a little UI application, very much like a Java applet, an ActiveX component, or a Flash movie. Questlets are not intended to take over the HTML page. Rather, they enhance the typical behavior of related UI elements as might otherwise be used in prior art systems.

Figure 6:
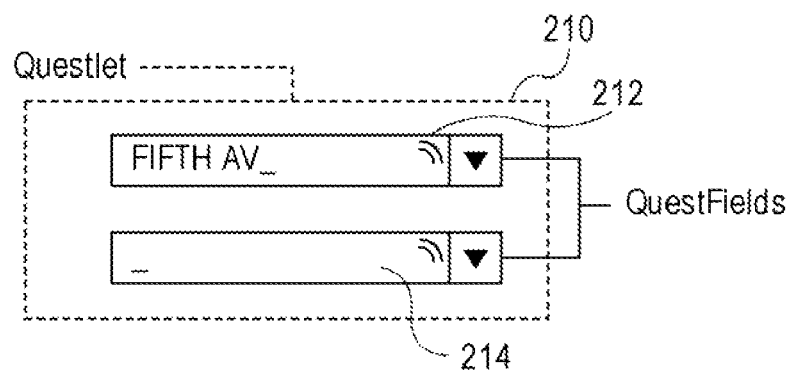
FIG. 6 shows an illustration of an asynchronous session-based search system including multiple front-end client search fields.

FIG. 6 shows an illustration of an asynchronous session-based search system including multiple front-end client search fields.

QuestObjects service providers bundle and deliver their services through Content Channels. Service providers are also known as Syndicators because they can subscribe to each other's Content Channels.

Questlets are separate from the Web application: They typically do not interact or interfere with current business logic. Questlets are connected to an existing Web application at only two points: the user interface and the data store.

As shown in FIG. 6, a Questlet 210 contains QuestFields 212, 214 that replace some or all of the input fields in the Web application's user interface. QuestFields do not usually change the semantics of input values; they simply add dynamic interactivity to the application.

A Questlet and its QuestField(s) interact with the database to accommodate the interactive behavior of the user interface.

Because QuestObjects adds interactive behavior to client-side elements based on server side data, it might seem that network traffic would be substantially increased and performance degraded. However, network traffic is reduced to a minimum by sending partial datasets rather than complete ones. For example, suppose a Web application has an auto-completing QuestField using a Content Channel containing artist names in a music database. When a user starts typing, the QuestField requests data from the data source through the Artist Channel. If the first letter is a c, the result set containing all artists starting with a c is probably quite large. The QuestField can be configured to just ask, for instance, for just the first 20 artists. The QuestField retrieves more results as the user scrolls through the drop-down list contained in the QuestField.

Even if the QuestField asks for more results, only the difference between the QuestField's current data set and the QuestField's requested data set is transmitted over the network, thus further reducing traffic.

The QuestField's "data retrieval intelligence" has important architectural implications. The client is not the only location where the result set is maintained. The QuestObjects Server itself also maintains this information in order to calculate information to be sent to the client.

Figure 7:
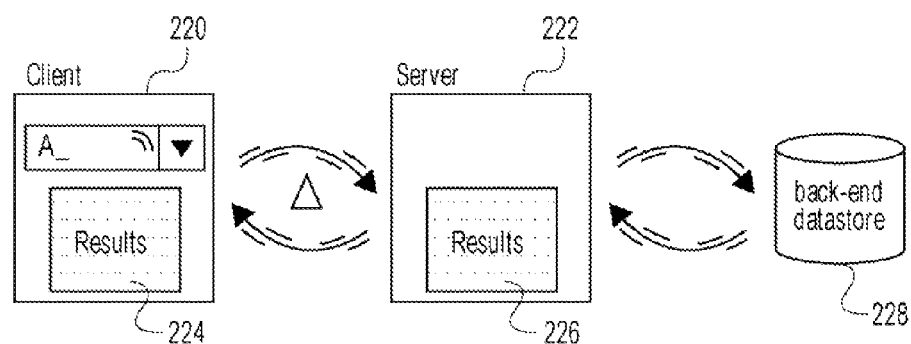
FIG. 7 shows an illustration of an asynchronous session-based search system including a front-end client search fields, a server, result storage, and a back-end server datastore.

FIG. 7 shows an illustration of an asynchronous session-based search system including a front-end client search fields 220, a server 222, result storage 224, 226, and a back-end server datastore 228.

Figure 8:
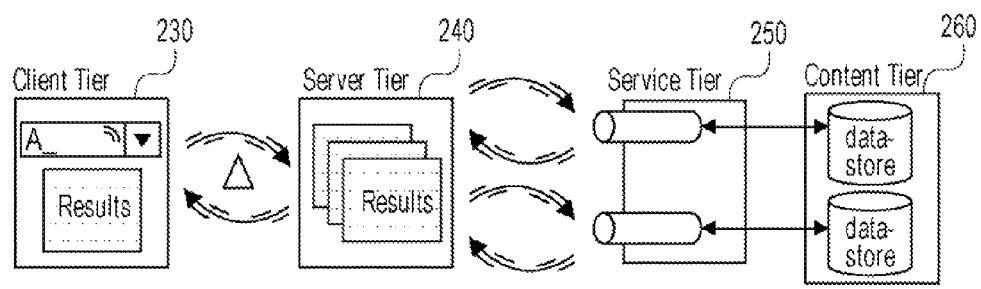
FIG. 8 shows an illustration of a multi-tier asynchronous session-based search system including client tier, server tier, service tier, and content tier.

The QuestObjects system can be deployed over multiple tiers as shown in FIG. 8, which shows an illustration of a multi-tier asynchronous session-based search system including client tier 230, server tier 240, service tier 250, and content tier 260.

QuestObjects Client—The Client Tier runs the Questlet and its QuestField(s). It is typically deployed in a Web page, where a Web server such as Apache or Microsoft IIS serves the Questlet.

QuestObjects Server—The Server Tier manages client sessions. It maintains an administration for each QuestField. As mentioned above, this administration reduces network traffic.

The QuestObjects Server runs as a servlet in a standard servlet container such as Tomcat or JBoss.

QuestObjects Service—Service providers called Syndicators offer information disclosed by QuestObjects. The Service Tier runs these Syndicators, which provide their services through Content Channels. A Syndicator offers subscription-based access to its Content Channels for managed user groups. A Syndicator collects statistics and provides billing information.

Like the QuestObjects Server, QuestObjects Services run as a servlet in a standard servlet container.

Content Engine—Content is stored in another tier, called the Content Engine, which is usually located outside the QuestObjects system. Syndicators use Content Access Modules (CAMs) to link each Content Channel to a data store disclosed by the Content Engine. A CAM provides an abstraction layer between the QuestObjects system and any data store. QuestObjects currently includes CAMs that access any SQL-compliant database through JDBC or any enterprise directory through LDAP.

QuestObjects Clients

Client applications that take advantage of QuestObjects will usually comprise multiple windows or web pages. Each window or web page in a client application may use one or more QO Client elements: Visible or invisible client components that implement QuestObjects behavior. Some user interfaces may dynamically add or remove QO Client elements to a window (e.g., when a user opens a new tab pane in the application), at which time other QO Client elements may remain active, or are destroyed (e.g., when a web page is replaced by another page). QO Client elements may be only a small part of the client-side application, although some QO Clients may remain active during the entire life of the client application. A QO Client Controller may refuse a Quester (perhaps because it isn't connected to a server that has the Channel requested by the Quester) by passing it a reference to a different controller. This can be transparent to the QuestField.

Multiple QO Client elements in an application (or multiple client applications running in an OS or virtual machine) can share connections to the database. This is achieved by having them communicate through a single "QO Client Controller". The QO Client Controller is responsible for the QO Protocol (QOP), maintaining the Quester registry (including waiting requests and matching results), handling of dependencies (probably through a separate object), and request buffering for network optimization. When QO Client elements share a connection to the database, the connection is only established once. Additional QO Client elements an register themselves with an existing session; QO Client elements that are no longer used deregister themselves. The QO Client Controller is independent of QO Client elements: Conceptually, the Client elements find a suitable controller rather than the other way around. This ensures that a QO Controller may survive the life of QO Client elements: QO Client elements can be instantiated and destroyed during the life of a QO Controller. Client-server connection state (a.k.a. controller state) can be displayed by any QuestField that has a Quester connected to the corresponding QO Client Controller. In order not to unnecessarily complicate the user interface, only the first currently visible QuestField may actually display the connection state.

QO Client software is fault-tolerant. If communication errors occur, the client-side objects can function in off-line mode. An auto-completing QuestField, for example, will allow users to keep typing into the field, and the value in the entry field can still be submitted to the web application.

A QO Client's full state, including the current input buffer, results, selection state, etc, may be "frozen" and "restored" at a later date. This allows a QO Server to restore the QO Client after the client has been away. This could be necessary if the client application crashed, lost its connection, or if the client page was refreshed by using the back-button in a browser. A related feature is suspension and resumption of active sessions during client-side sleep.

A QO Client may allow users to store local preferences. For example, a user of an auto-completing QuestField may switch auto-completion on or off. Or a user of a drop-down list may set a preference to have the drop-down list open itself automatically as soon as results are received from the QO Server.

Through the concept of "String Types" and "Query Types", QO Clients may interrogate directory services for QuestObjects Services and Channels that return specific types of content using specific types of queries. This makes it possible to create clients that work with result sets that contain data in a known format, without making those clients dependent on a specific channel.

QO Servers and Content Services may send meaningful (textual) messages for display by the Client. The Client sends optional language information to the Server at registration, allowing Server or Service to return appropriate messages for the Client locale. Clients do not need to be aware of possible server-side messages and are thus generic.

A web-based QO Client is able to submit its input buffer (either the entered part or the auto-completed string), current result string, or selected result strings (or corresponding keys) to the server using the non-QO specific browser submit mechanism (through GET or POST), allowing users to keep using form fields in the "old" way. QO Clients can therefore be used to enhance existing web-based applications, without needing to rewrite server-side application code.

Depending on rules set by the Channel, a QO Client may validate a query before sending it to the server (note that the server must still know the latest input buffer in order not to send the previous query results to the client).

A QO Client may define a default (initial) value for its input buffer, causing the QO Server to perform a query as soon as the Quester is registered. This may be necessary to support browser "back" functionality, where a QuestField retrieves its previous input buffer value from a form input field.

A Client receives the expiration date/time for each result set, which may be overridden by individual strings in the result set. A client can use this to automatically re-query an expired result set or to automatically re-query metadata for strings that have expired (which may be necessary in a document management system that returns a list of documents, some of which may have very time-sensitive information).

A QO Client's value and query may depend on values in other fields in the application. If these other fields are also QO Clients, these dependencies may include: the key of a specific index in the result set; the string at a specific index in the result set; a set of keys for all selected indices in a result set; a set of strings for all selected indices in a result set; a set of keys in an index range; a set of strings in an index range; all result keys, or all result strings.

Web Page Integration

Figure 9:
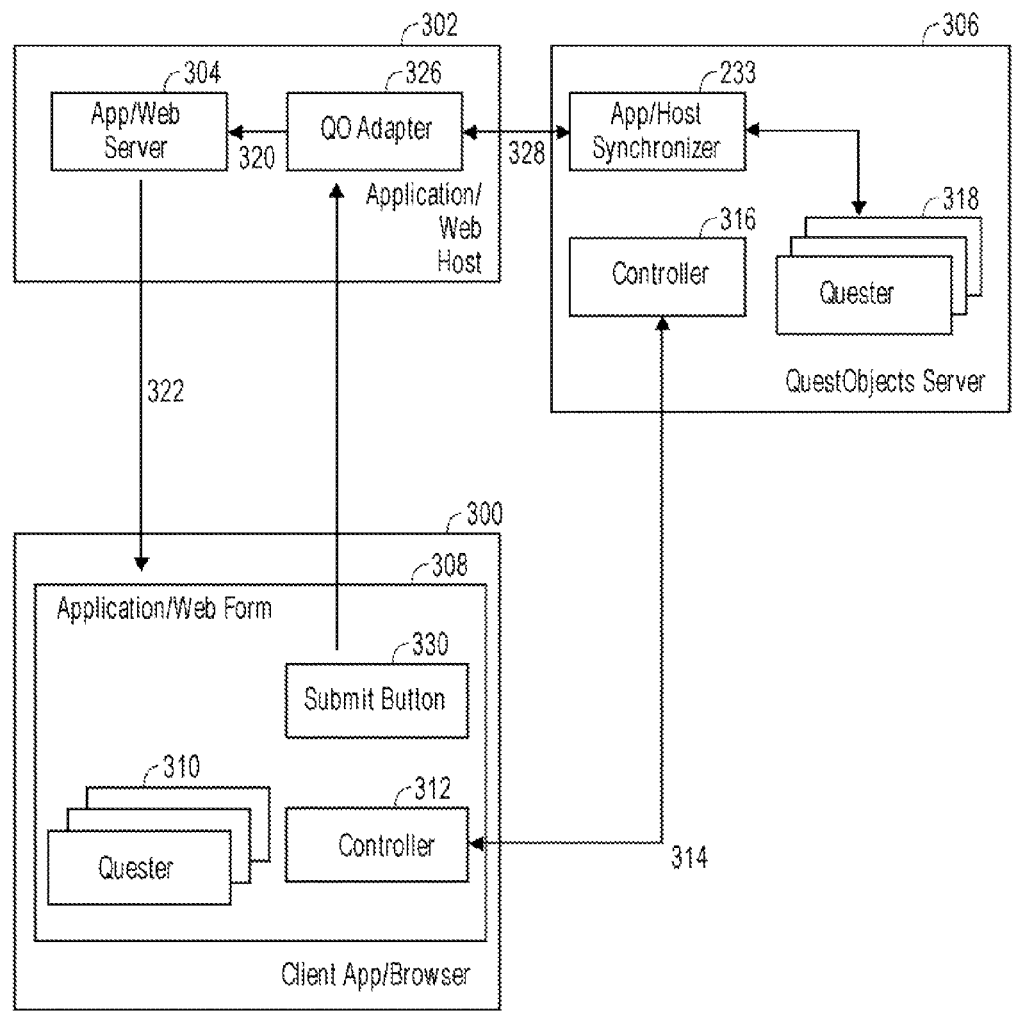
FIG. 9 shows an illustration of an asynchronous session-based search system for use with web forms or other web interfaces.

FIG. 9 shows a method for using the present invention in systems that have limited technical capabilities on the Client side, such as, for example, web browsers with embedded Java applets, Flash movies, or other browser components or plug-ins. If developers of client systems have not integrated Client components of the present invention into their client software, then Client components needed for the present invention may be present as Plug-Ins, DLL's, or an equivalent device, or they can be downloaded to the client computer as applets. These applets can be written in the Java language, ActionScript, or other browser component language, when they are needed.

Although the system depicted in FIG. 8 can be used to support clients in practically any server-based application server, and particularly in the case of a web server hosting an application used by end users to enter data that is partially retrieved using the present invention, the system is not limited to the web. The system provides an ideal solution for current web-based applications that consist of web browsers 300 on the client side and web host computers 302 with web server software 304 on the server side. To allow the web server to access data selected using the present invention, this system provides a link between the web server and the QuestObjects Server 306. In this case, QuestObjects Server acts as a data-entry proxy between the existing client system (web browser) and the existing web server. Data entered by the client is submitted to the QuestObjects Adaptor instead of to the web server. The QuestObjects Adaptor then fills in the values of the Questers and passes the data to the web server. An Application Proxy is not required if the QuestObjects Client components can directly insert data into the client entry form on the web browser, as is the case on certain platforms that allow integration between Java applets or other components and JavaScript in the web browser.

In FIG. 9, the web server runs on a host computer 302, typically associated with a fixed IP address or an Internet host name. The web server is accessed by any number of clients using web browsers 300. To allow users to enter data and send data to the server, web pages make use of HTML forms 308. To use the present invention, user interface elements such as entry fields in these HTML forms are associated with Questers 310 in the form of browser Plug-Ins, Java Applets, Flash Movies, or other browser components, or Client-script language implementations including QuestObjects Clients built in JavaScript or VBScript. Through a QuestObjects Controller 312 those Questers allow the user to access one or more QuestObjects Services hosted by a QuestObjects Server 306 using the protocol 314 of the present invention. The Server Controller 316 forwards user actions generated in the Client Questers 310 to their corresponding Server Questers 318 that thus are always aware of data selected in the Client. When a Server Quester is first activated, it checks whether it is being used by a client system that requires the use of an Application Proxy. If the answer is yes, then the Quester creates 320 a corresponding AppHost Synchronizer 322 that contacts the QuestObjects Adaptor 326 on the host computer 302 using a standardized protocol 328. The QuestObjects Adaptor then knows which QuestObjects Server to contact to retrieve QuestObjects data 326 after the user submits form data 330 to the application host using the existing application protocol 332, such as HTTP POST or HTTP GET. The QuestObjects Adaptor then replaces the appropriate form field data with the strings selected in the Server Questers 318 before forwarding this form data, now including data selected using the present invention, to the web server 320, and thence to the client 322.

Figure 10:
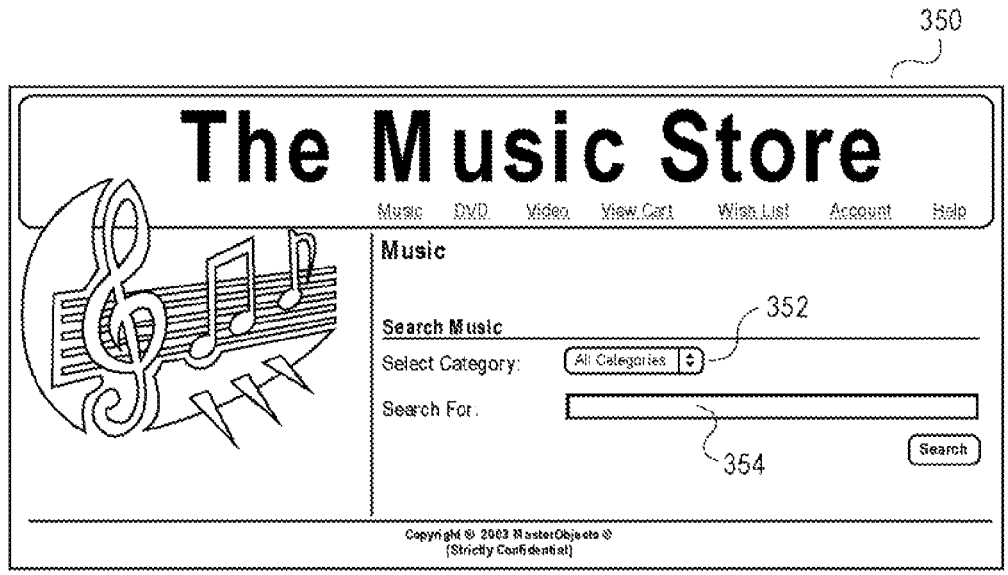
FIG. 10 shows an illustration of a web interface in accordance with the prior art.

QuestFields may be easily and seamlessly integrated into a current Webpage. The first step is to determine which non-interactive HTML search fields are to be replaced by interactive QuestFields, as shown in FIG. 10. FIG. 10 shows an illustration of a web interface 350 in accordance with the prior art.

In this example, the "Category" 352 and "Search" 354 fields are to be replaced with QuestFields, and because Quest-Fields are able to find and display records "on the fly", the "Search" button is now unnecessary and can be removed. To provide the user with additional information, a QuestField called "Album" is added.

Figure 11:
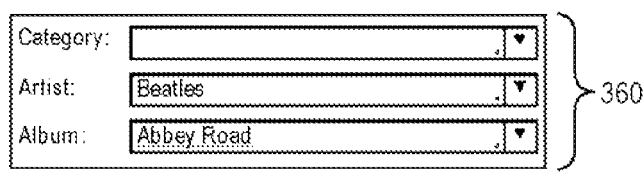
FIG. 11 shows an illustration of a web-based search field in accordance with an embodiment of the invention.

The next step is to build the Questlet containing the Quest-Fields with the same look-and-feel as the target Web page. MasterObjects provides a default Questlet implementation built using Macromedia Flash. FIG. 11 shows an illustration of a web-based search field 360 in accordance with an embodiment of the invention.

Finally, the client is added to the Web page after removing old form fields or after making them invisible. FIG. 12 shows a listing of a html and JavaScript code 370 in accordance with an embodiment of the invention.

Figure 13:
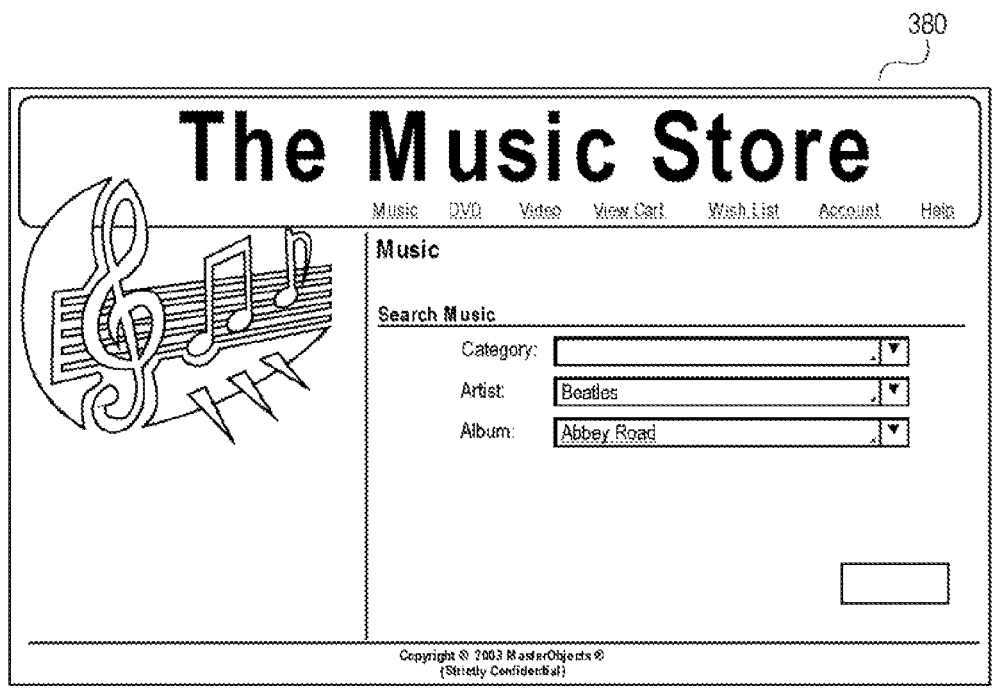
FIG. 13 shows an illustration of a web-based search field as it is used to receive data from a server in accordance with an embodiment of the invention.

FIG. 13 shows an illustration of a web-based search field 380 as it is used to receive data from a server in accordance with an embodiment of the invention.

Configuration

QuestObjects configuration is done using a straightforward text files for each Server, each Content Channel, and each database or directory connection. The configuration file of Content Channels that communicate through the JDBC Content Access Module includes the actual database queries with appropriate bind variables.

The configuration file of Content Channels that communicate through an LDAP connection contain the actual LDAP queries performed on the enterprise directory.

QuestObjects Protocol

QuestObjects uses a powerful protocol called the QuestObjects Protocol (QOP). QOP does not rely on the use of cookies and is designed to be compliant with existing Internet and Security standards. QOP is used for communication between Questlets and QuestObjects Servers. This is done transparently using XML in optional SOAP envelopes using HTTP(S) as the transport layer. Additional details defining an embodiment of QOP are provided below.

Security

QOP can be configured to run over SSL for complete security. Either the entire Web page, or just Questlet-Server communications can be securely encrypted. QuestObjects is designed so that neither users nor administrators need to worry about the details of the communication protocol.

Load Balancing

QuestObjects is designed for large Internet applications. The QuestObjects Server, QuestObjects Service and/or the Content Engine (database) can reside on a plurality of machines, allowing for load balancing and capacity expansion simply by adding more hardware. A QuestObjects Server uses "sticky" session connections. A client can logically connect to any server machine in the system. Once a session is established, all communications from the client IP address go to and from the same server.

Use of System for Interactive Database Searching

The system described above may be utilized in a Web, online, or similar environment, for purposes of interactive database searching, data entry, online purchasing, or other applications. This section describes how an embodiment of the invention may be incorporated into such an online environment.

Figure 14:
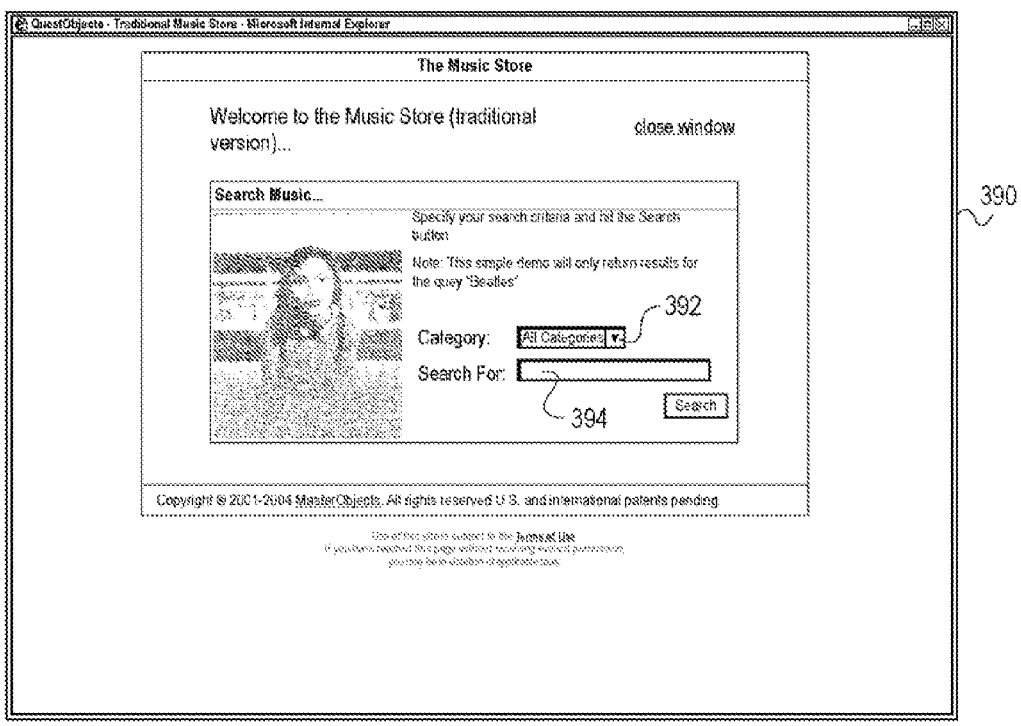
FIG. 14 shows a screenshot of a music search input screen in accordance with the prior art.

FIG. 14 shows a screenshot of a typical search screen interface 390 in accordance with the prior art, that may be used, for example, with a database application, an online application, or an online purchasing system. In this example, the interface is part of an online music store application, and allows a user to search for music records. As is typical with such applications, the user may select a category (in this instance from a pull-down list 392, although in other instances the user may select from a bullet-list). When the category has been defined, the user may enter their search criteria in the window 394 provided. While a category pull-down is not essential, it is commonly used in online and other environments to allow the user to narrow down the potential search results. When a category list is not provided, the system typically returns more hits than is desired.

Figure 15:
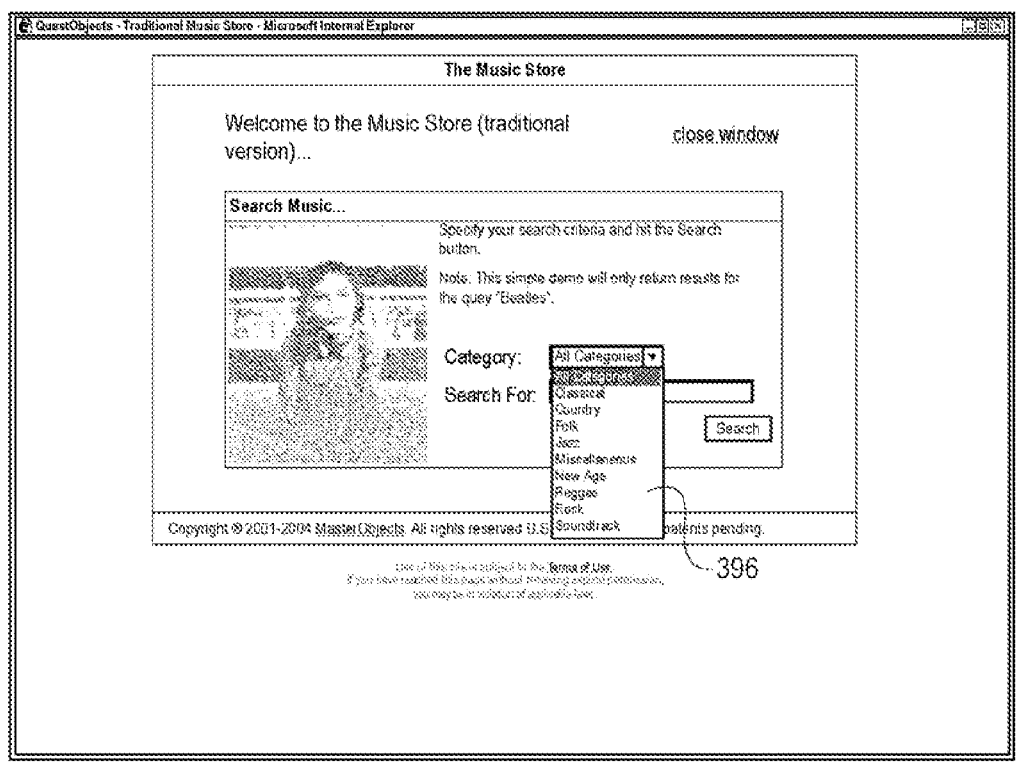
FIG. 15 shows a screenshot of a music search input screen in accordance with the prior art.

FIG. 15 shows a screenshot of the same search screen interface 390 in accordance with the prior art, illustrating the selection by the user of a particular category 396. One of the problems with the traditional interface is it provides no feedback to the user as to available options. Using the interface shown in FIGS. 14 and 15, all of the communication is one-way, i.e. from the user. But when the user selects a category, they have no knowledge as to whether there are any database records matching that category. Similarly, when the user enters a search criteria, there may be no matching hits. Furthermore, there is no feedback provided to the user that, for example, a more appropriate search might be useful, or that there may be slightly different spellings of that search term.

Figure 16:
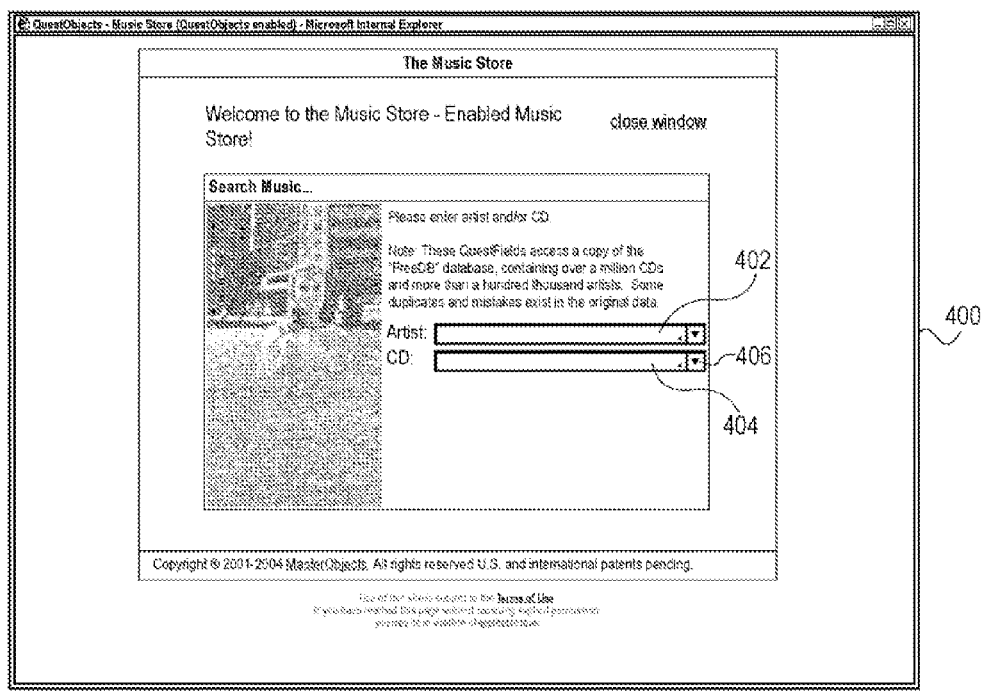
FIG. 16 shows a screenshot of a music record search input screen in accordance with an embodiment of the invention.

FIG. 16 shows a screenshot of a search screen interface 400 in accordance with an embodiment of the present invention, illustrating how the QuestObjects technology can be used to assist a user with the search and selection of a database resource, and particularly address the feedback problems discussed above. Similarly, this example illustrates the interface as part of an online music store application, and allows a user to search for music records. In this embodiment a pair of pull-down lists are provided, one for Artist name 402 and one for CD name 404. However, in other embodiments neither of the search fields may necessarily include a pull-down portion. Each search field indicates, in this instance by means of a small triangular arrow 406, that the search field is enabled for use with the QuestObjects system. Depending on the embodiment, other indicators may be used, or indeed no indicator may be used.

Figure 17:
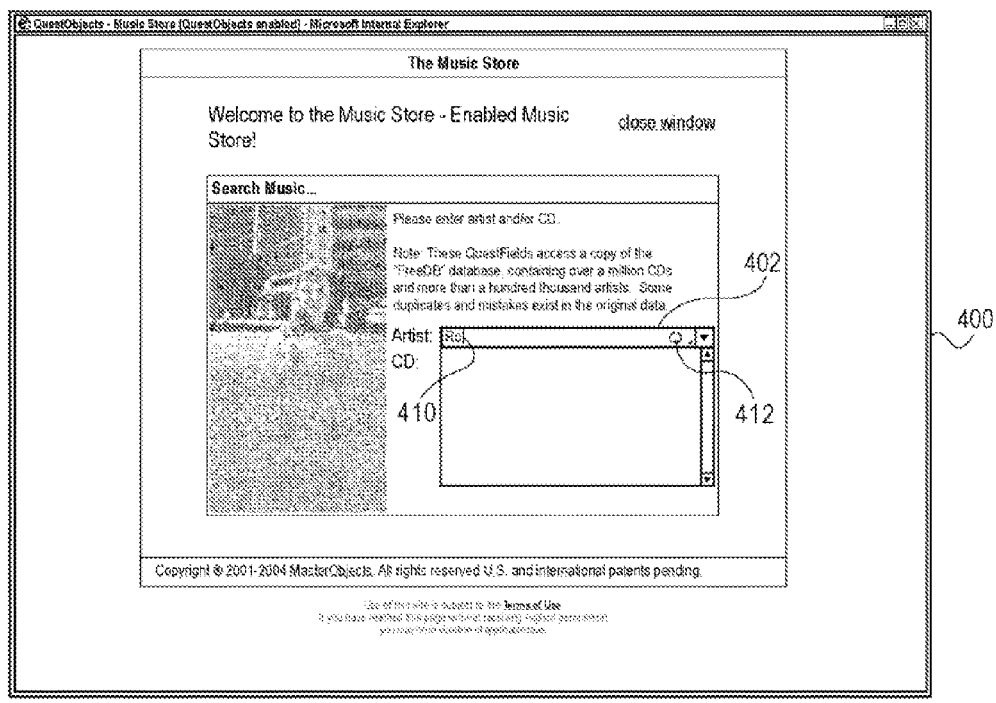
FIG. 17 shows a screenshot of a music record search input screen in accordance with an embodiment of the invention.

FIG. 17 shows a screenshot of a search screen interface in accordance with an embodiment of the present invention, illustrating how the system responds when a user enters data into a QuestObjects enabled search field. As shown in FIG. 17, as the user enters search data 410, in this instance the first letter, or a few letters, of the Artists name, the search field displays an icon, in this instance a pair of rotating arrows, to indicate that the search field is communicating, via the QuestObject, search data to the server. The rotating arrow icon also indicates that the client is receiving corresponding information from the server as a result of the search data that has been sent.

Figure 18:
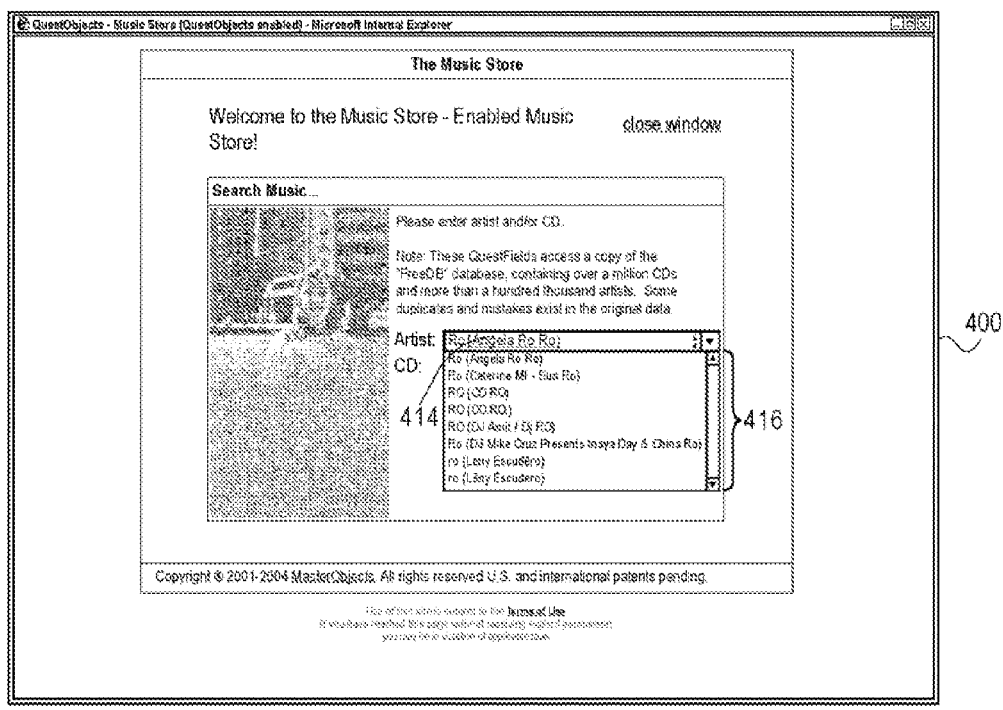
FIG. 18 shows a screenshot of a music record search input screen in accordance with an embodiment of the invention.

FIG. 18 illustrates the type of information that is dynamically returned to the user as they enter input data. Although there is no "submit" or similar button, since the client maintains a session with the server, and automatically sends and receives information from the server as data is entered, the server provides the client with increasingly appropriate information from the database. In the example shown in FIG. 18, as the user enters the text "r, o, . . . " etc. 414, the server automatically responds with a list of records 416 matching this input data. In the embodiment shown, the records are presented as a list, from which the user may select one or more of those entries. Alternatively, if the desired record is not currently shown, the user can continue to enter input data to focus the search, and receive at the client more appropriate results.

Figure 19:
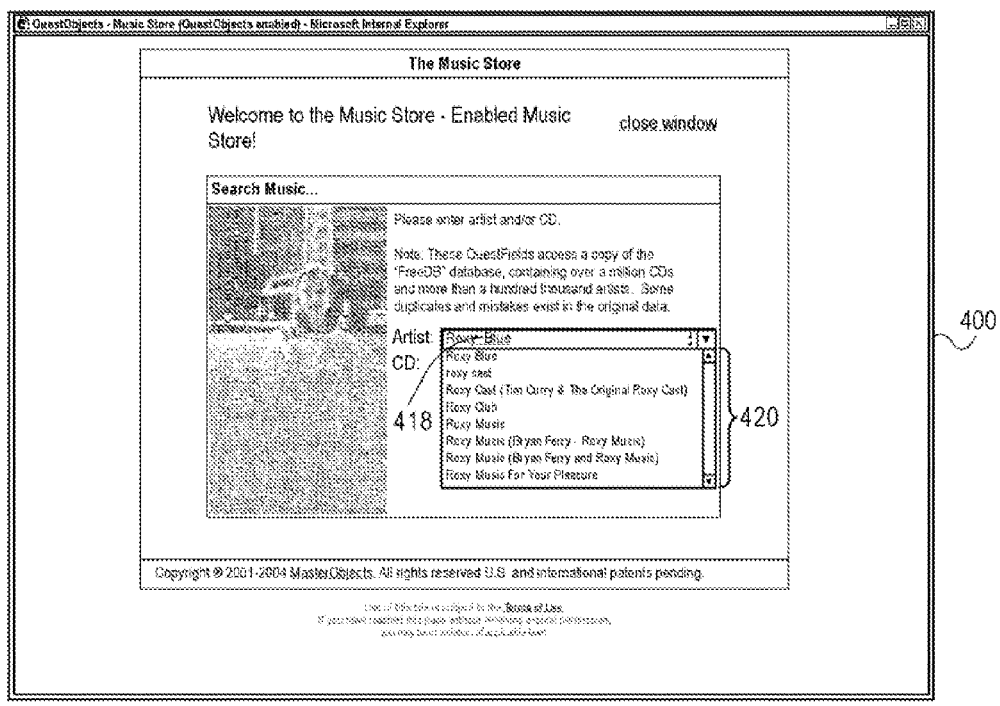
FIG. 19 shows a screenshot of a music record search input screen in accordance with an embodiment of the invention.

FIG. 19 shows the same example as the user enters more input data 418. As the data is received, the server suggests increasingly more appropriate records 420 from which the user can select. In this manner the system may also be used to provide dynamically focused suggestions to the user.

Figure 20:
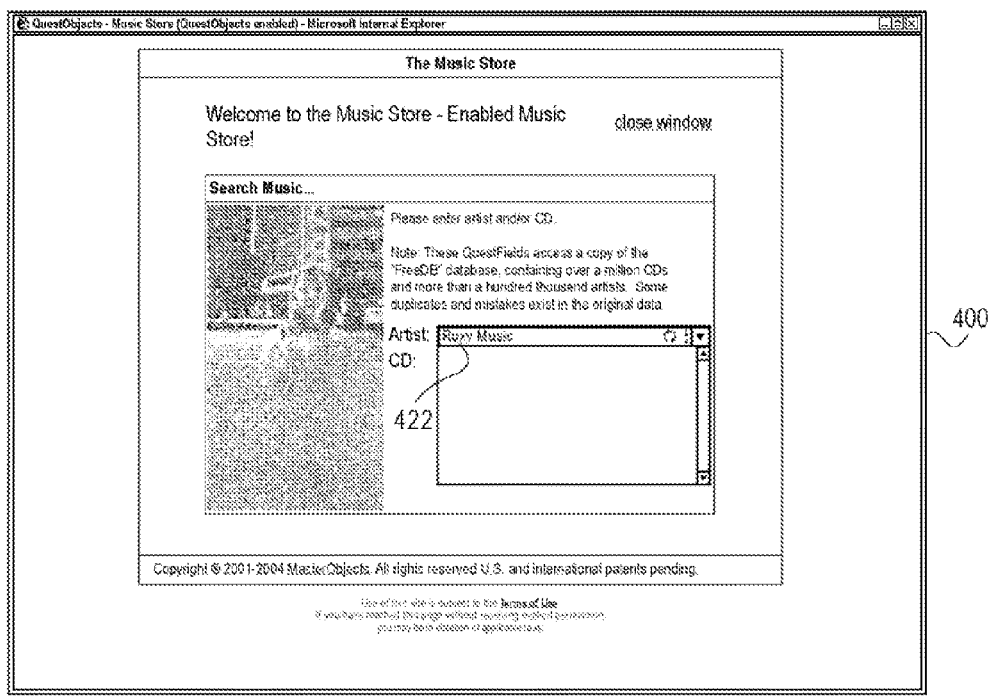
FIG. 20 shows a screenshot of a music record search input screen in accordance with an embodiment of the invention.

FIG. 20 shows the same example as the user enters more input data. 422 As the data is received, the server suggests increasingly more appropriate records from which the user can select. At this point the user has entered almost a complete Artist name. Again, as described above, the rotating arrow icon 412 indicates that input data is being automatically sent from the client to the server, while appropriate search records are retrieved for subsequent display on the client.

Figure 21:
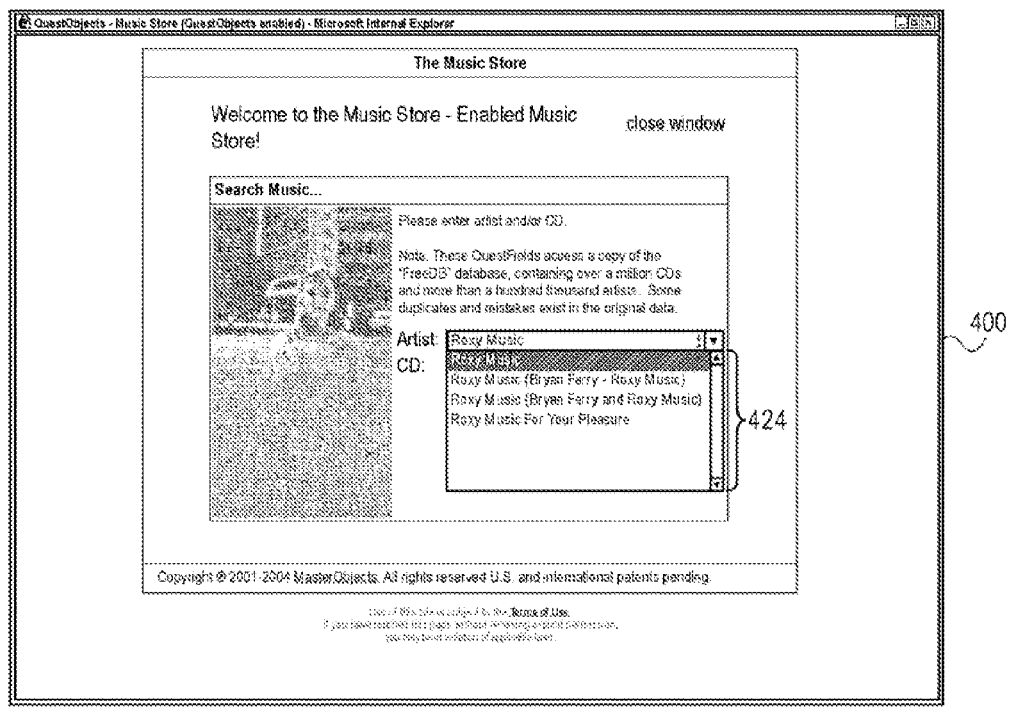
FIG. 21 shows a screenshot of a music record search input screen in accordance with an embodiment of the invention.

FIG. 21 shows the same example as the user is presented with appropriate Artist name records 424 from the server, based upon the input data.

Figure 22:
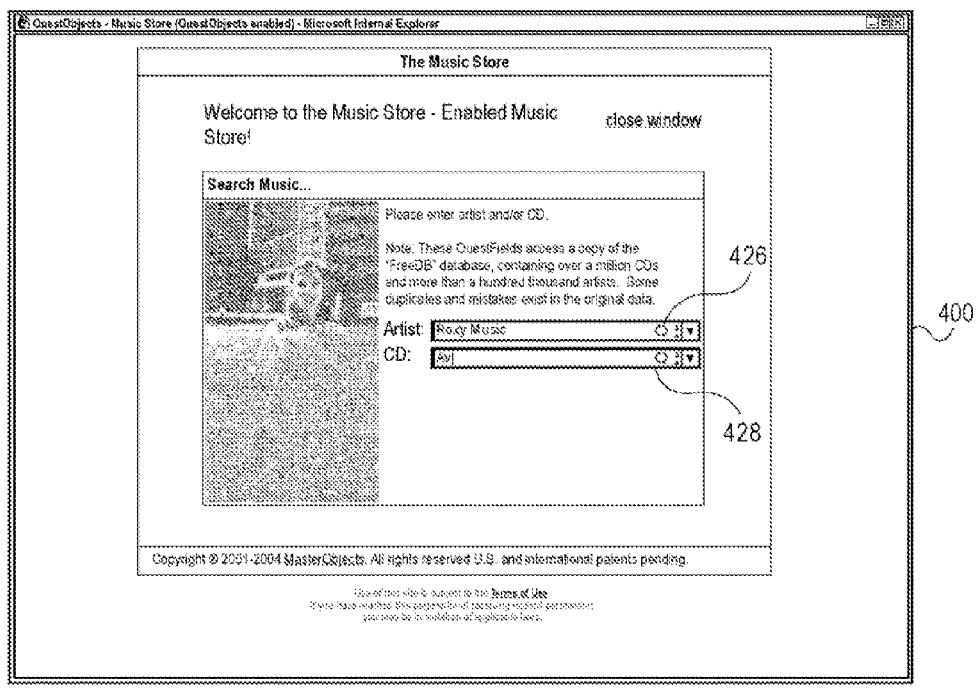
FIG. 22 shows a screenshot of a music record search input screen in accordance with an embodiment of the invention.

FIG. 22 shows the same example as, this time the user has selected an Artist 426, and is repeating a similar search sequence with the CD name 428.

Figure 23:
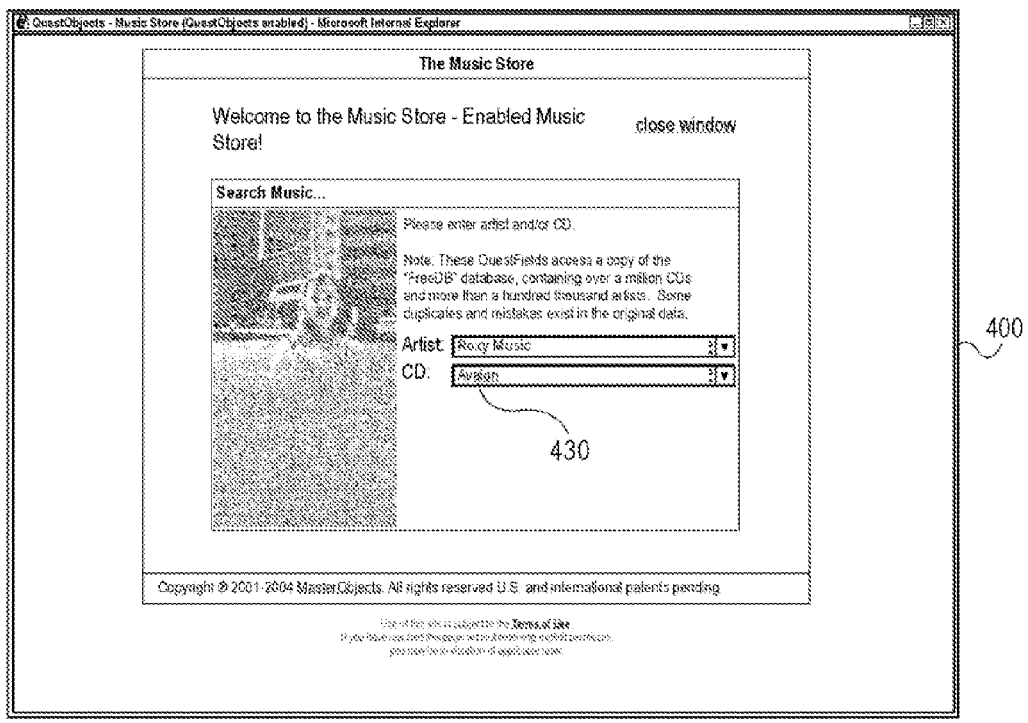
FIG. 23 shows a screenshot of a music record search input screen in accordance with an embodiment of the invention.

FIG. 23 shows the same example as the user is presented with appropriate CD name records 430 from the server, based upon the input data.

Use of System for Interactive People Searching

Figure 24:
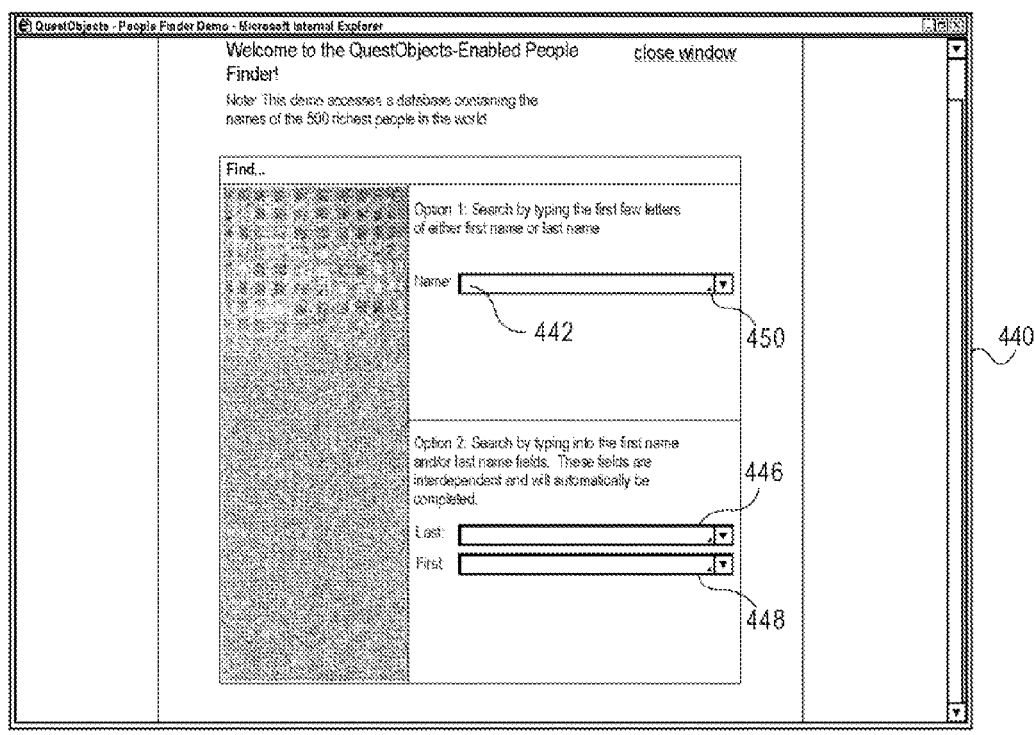
FIG. 24 shows a screenshot of a person search input screen in accordance with an embodiment of the invention.

FIG. 24 shows a screenshot of a search screen interface 440 in accordance with an embodiment of the present invention, illustrating how the QuestObjects technology can be used to assist a user with the search and selection of a name database resource, for use in people searching. In one embodiment (shown as Option 1 in FIG. 24) a pull-down list 442 is provided for the persons Name. In another embodiment (shown as Option 2 in FIG. 24) a pair of pull-down lists 446, 448 are provide for the persons Last Name, and First Name. As above, in other embodiments neither of the search fields may necessarily include a pull-down portion. Also as above, each search field indicates, by means of a small triangular arrow 450 or other device, that the search field is enabled for use with the QuestObjects system. Depending on the embodiment, other indicators may be used, or indeed no indicator may be used.

Figure 25:
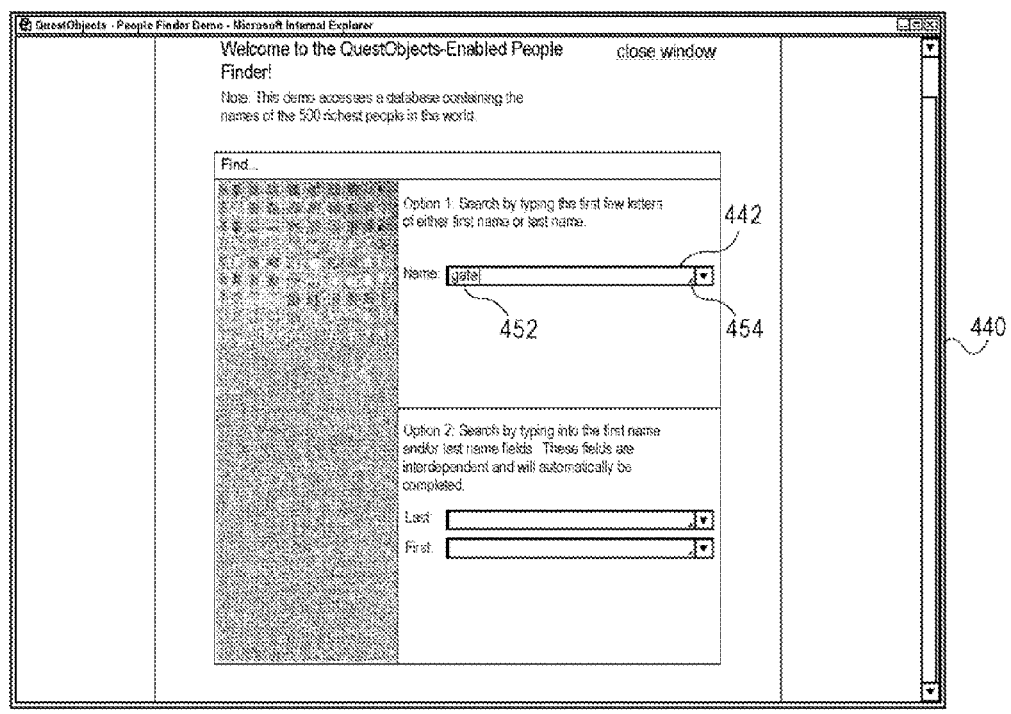
FIG. 25 shows a screenshot of a person search input screen in accordance with an embodiment of the invention.

FIG. 25 shows a screenshot of a search screen interface in accordance with an embodiment of the present invention, illustrating how the system responds when a user enters data into a QuestObjects enabled search field. As shown in FIG. 25, as the user enters search data 452, in this instance the first letter, or a few letters, of the persons Name, the search field displays an icon, in this instance a pair of rotating arrows 454, to indicate that the search field is communicating, via the QuestObject, search data to the server. The rotating arrow icon also indicates that the client is receiving corresponding information from the server as a result of the search data that has been sent.

Figure 26:
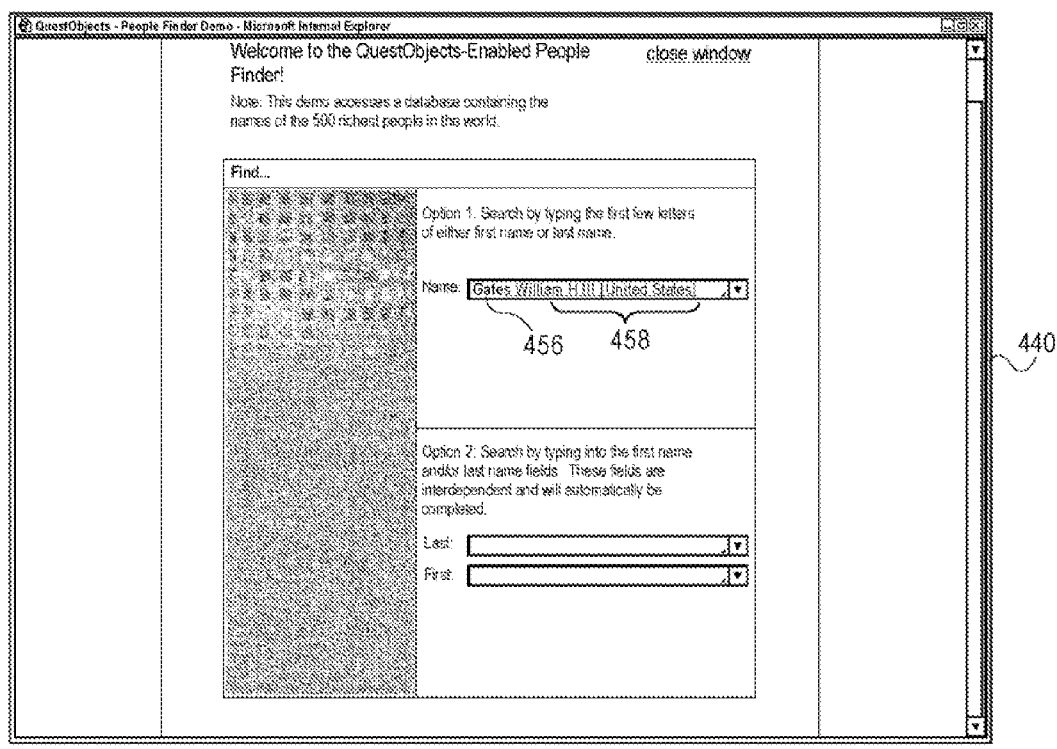
FIG. 26 shows a screenshot of a person search input screen in accordance with an embodiment of the invention.

FIG. 26 illustrates the use of Option 1, and the type of information that is dynamically returned to the user as they enter input data. As above, although there is no "submit" or similar button, since the client maintains a session with the server, and automatically sends and receives information from the server as data is entered, the server provides the client with increasingly appropriate information from the database. In the example shown in FIG. 26, as the user enters the text "g, a, . . . " etc. 456, the server automatically responds with a list 458 of name records matching this input data. In the embodiment shown, the records are presented as a list, from which the user may select one or more of those entries. Alternatively, if the desired record is not currently shown, the user can continue to enter input data to focus the search, and receive at the client more appropriate results.

Figure 27:
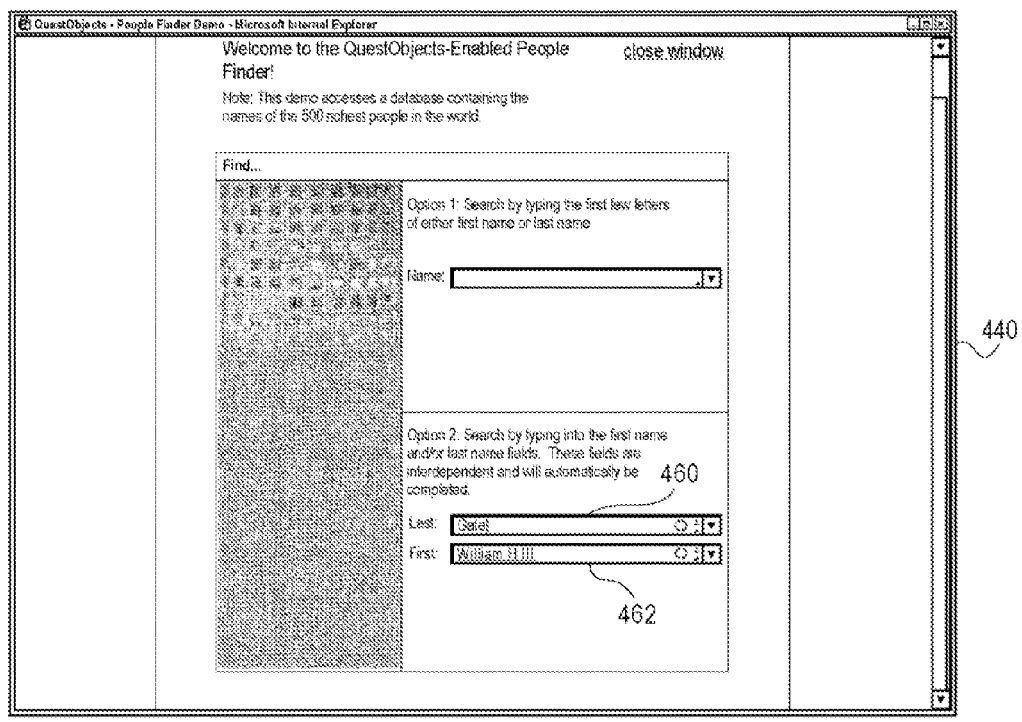
FIG. 27 shows a screenshot of a person search input screen in accordance with an embodiment of the invention.

FIG. 27 illustrates the use of Option 2, and the type of information that is dynamically returned to the user as they enter input data. In the example shown in FIG. 27, as the user can enter either the Last Name 460 and/or the First Name 462 of the person. Matching records are returned using a similar process as described above.

Use of System for Other Applications

Figure 28:
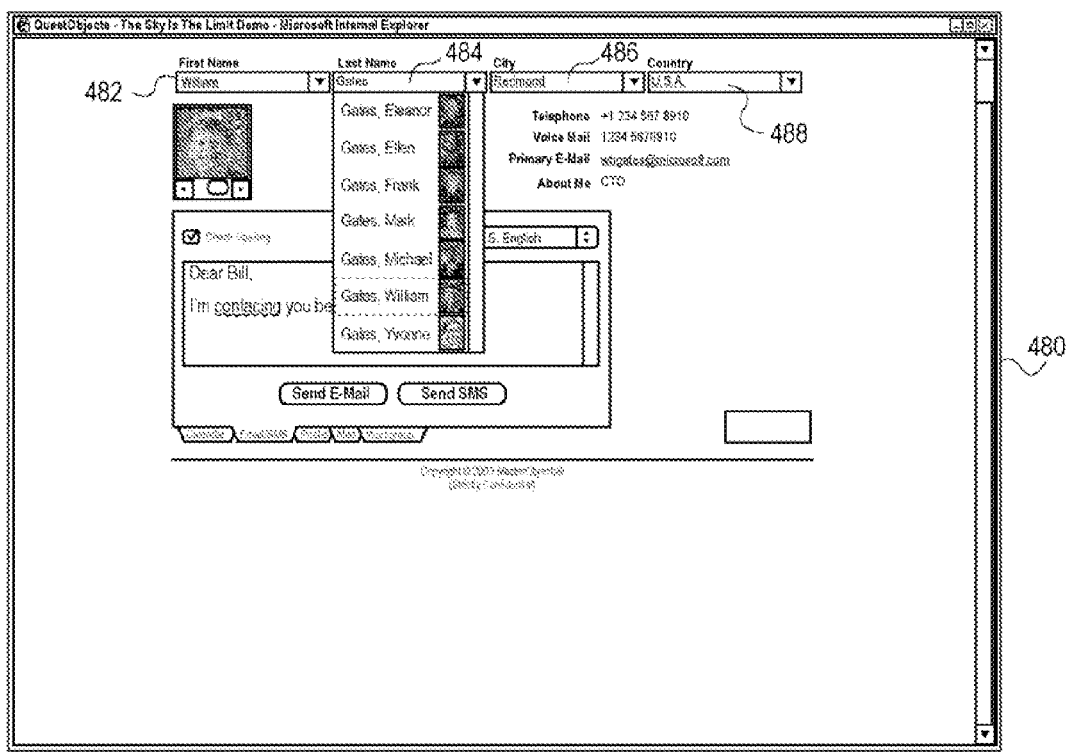
FIG. 28 shows a screenshot of a multiple field search input screen in accordance with an embodiment of the invention.

FIG. 28 shows a screenshot of a complex search screen interface in accordance with an embodiment of the present invention, illustrating how the QuestObjects technology can be used to create a multi-level search interface, with multiple smart search fields or devices. In this example the search interface includes QuestObjects-enabled fields for First Name 482, Last Name 484, City 486 and Country 488. As above, depending on the embodiment, the search fields may or may not include a pull-down portion. In the example shown in FIG. 28 the pull-down lists also include pictorial representation of the field entry, making it more intuitive for the user. Also as above, each search field may indicate by means of a small triangular arrow or other device that the search field is enabled for use with the QuestObjects system. FIG. 28 provides only an example of the type of interface that may be created using the QuestObjects system. It will be evident that a wide range of other interfaces may be similarly built with some or all of the QuestObjects features.

Variations on the Person Search Input Screen

Figure 29:
FIG. 29 shows a screenshot of an alternate person search input screen in accordance with an embodiment of the invention.

FIG. 29 shows a screenshot of an alternative person search input screen 490 in accordance with an embodiment of the invention. FIG. 29 shows a screenshot of a formatted results list including email hyperlink buttons and an indication of the number of results found.

Figure 30:
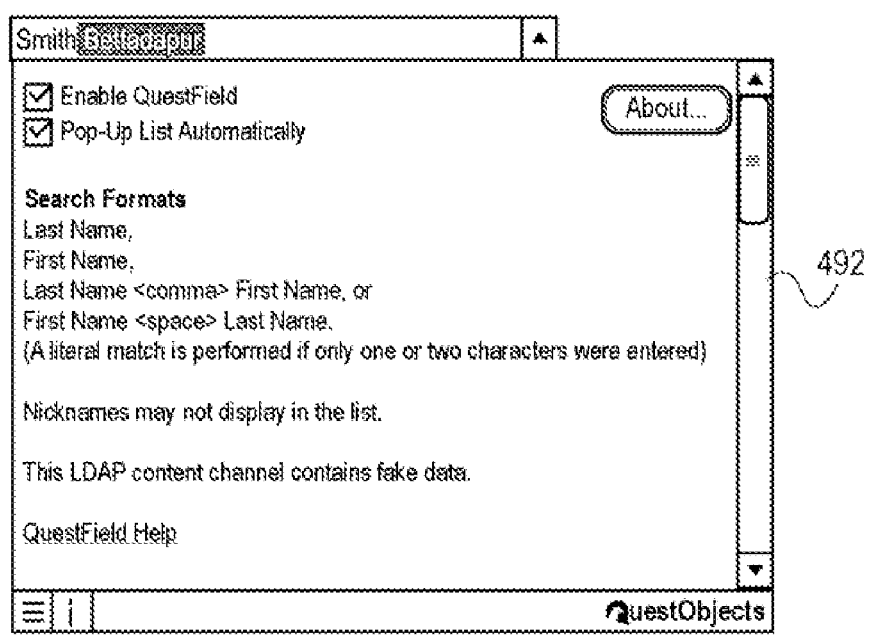
FIG. 30 shows a screenshot of an alternate person search input screen in accordance with an embodiment of the invention.

FIG. 30 shows a screenshot of an alternative person search input screen 492 in accordance with an embodiment of the invention. FIG. 30 shows a screenshot of an information pane that allows users to configure the QuestField and that shows QuestField- and Content-Channel-specific information and help.

Figure 31:
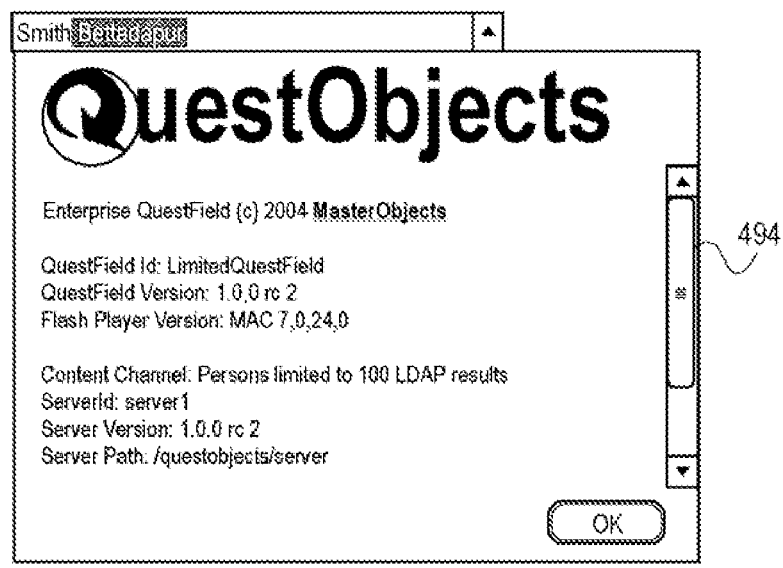
FIG. 31 shows a screenshot of an alternate person search input screen in accordance with an embodiment of the invention.

FIG. 31 shows a screenshot of an alternative person search input screen 494 in accordance with an embodiment of the invention. FIG. 31 shows a screenshot of an About Box that shows technical information and copyright information for a QuestField.

Variations on the Types of QuestFields

Using the QuestObjects technology, at least six basic types of QuestFields can be created, some of which are shown in the above examples. These QuestField types differ in complexity, but they all have one thing in common: they can enhance any web browser or handheld wireless device application that is used to enter, find, retrieve and/or manipulate information stored in remote databases.

AutoLookup QuestField

Figure 32:
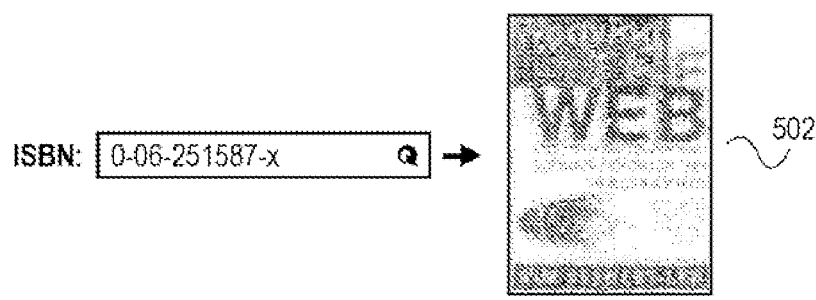
FIG. 32 shows an illustration of a QuestFields type in accordance with an embodiment of the invention.

FIG. 32 shows a screenshot of an AutoLookup QuestField 502. This is the simplest kind of QuestField. Upon user input (or after a dependent QuestField is modified), the QuestField does a "direct lookup" in the underlying content source where the data returned has a one-to-one relationship with the user input. Examples include a simple City QuestField that automatically displays the city for a specific Zip code, a Bank Number QuestField that verifies the validity of an account number, a Translation QuestField that automatically looks up the translation of text that the user has entered, a Stock Quote QuestField that returns a stock quote for a specific ticker symbol, or a Calculator QuestField that returns the result of a specific calculation performed on the user's input.

AutoComplete QuestField

FIG. 33 shows a screenshot of an AutoComplete QuestField 504. An AutoComplete QuestField assists the user during data entry by looking up multiple possible matches directly based on the user's character-by-character input. As the user types, the "best match" for the input is autocompleted into the input field. An optional popup list can display alternate choices to the user. The user input typically has a one-to-many relationship with the data that is returned by the content source, and the number of records returned is usually known. Examples include the PeopleFinder QuestField that looks up persons in a directory, a Product QuestField that helps the user find products, or an Account QuestField that helps the user in finding and entering customer account numbers.

AutoSearch QuestField

Figure 34:
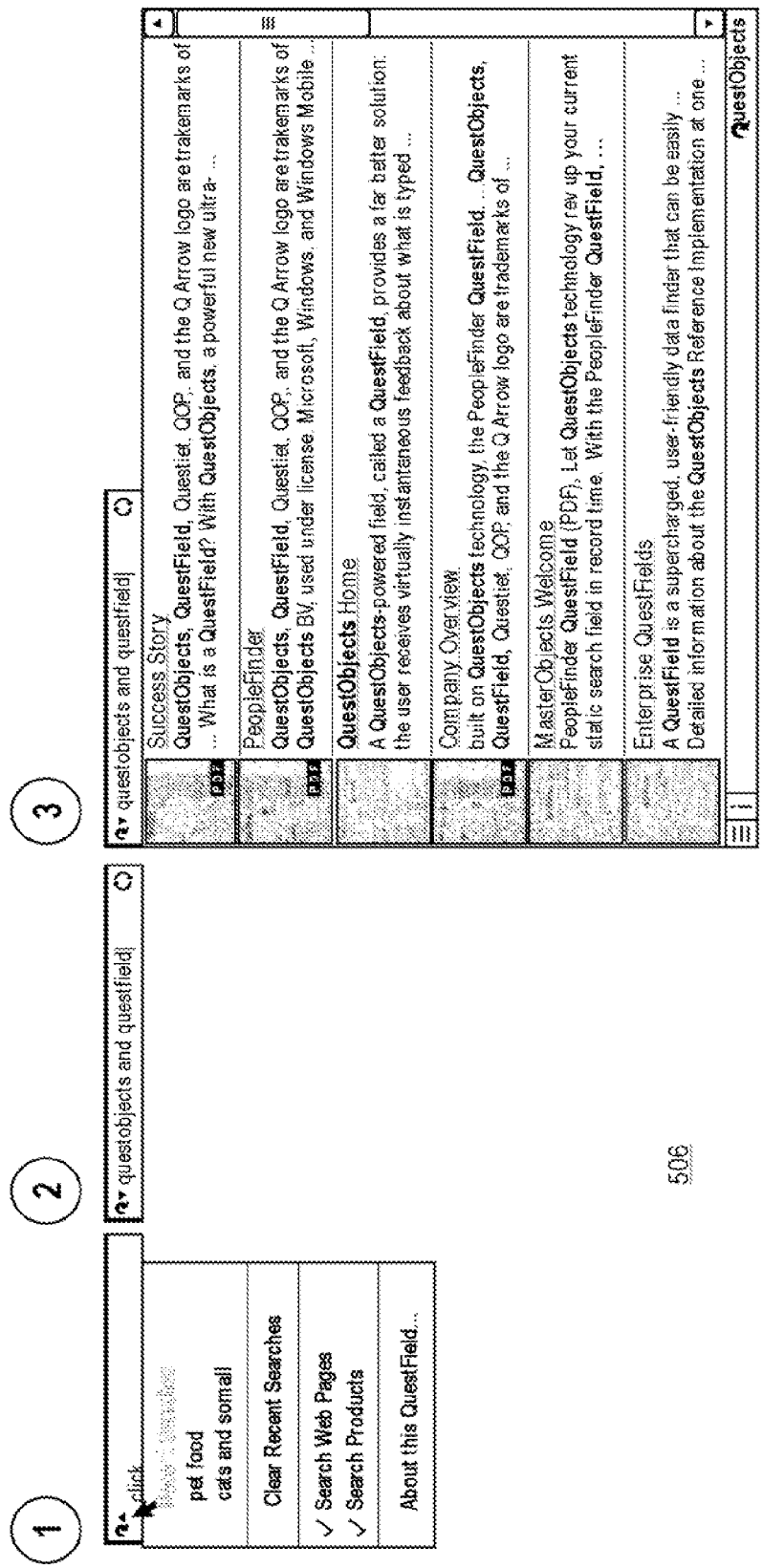
FIG. 34 shows an illustration of a QuestFields type in accordance with an embodiment of the invention.

FIG. 34 shows a screenshot of an AutoSearch QuestField 506. An AutoSearch QuestField interprets the user input as a discrete search query that can be in any query format supported by the underlying search engine. The input is not usually autocompleted in the input field because of the nature of the input, although some AutoSearch QuestFields will suggest queries from a word-index or from a user query history list. Similar to the AutoComplete QuestField, search results are immediately displayed in a formatted popup list. The number of results returned from the server is typically unknown and limited by the search engine. Results in the AutoSearch QuestField popup list are usually filtered and ranked before they are displayed. Examples include a Site Search QuestField that enables users to find pages on a website based on full text Boolean searches, or a Document Search QuestField that allows users to retrieve documents or files based on full text as well as other criteria. A publishing company, for example, can use AutoSearch QuestFields to allow users to quickly and efficiently search newspaper and magazine archives.

Relational QuestField

Figures 35, 36:
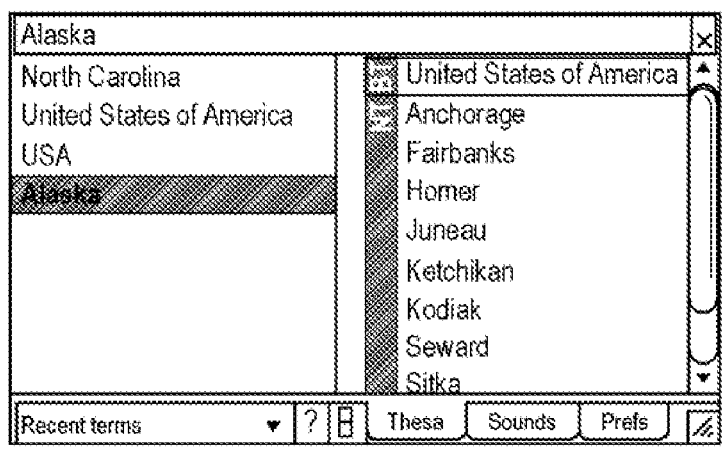
FIG. 35 shows an illustration of a QuestFields type in accordance with an embodiment of the invention.
FIG. 36 shows an illustration of a QuestFields type in accordance with an embodiment of the invention.

FIG. 35 shows a screenshot of a Relational QuestField 508. A Relational QuestField provides a complex user interface consisting of multiple entry fields adapted for a specific use. A Relational QuestField simultaneously accesses multiple content channels and allows users to enter multiple values or click on results to "navigate" through relational content. Relational QuestFields provide a sophisticated user interface that typically feels like a "browser" or "navigator" because it can use multiple columns, tree lists, or even three-dimensional ways to display the results. Examples include an Address QuestField that can be used to enter full addresses (street, city, state, zip, etc), a Thesaurus QuestField that allows users to navigate through a taxonomy of terms, and a File Browser QuestField that behaves similar to Windows Explorer, yet operates efficiently and securely on remote content.

FreeForm QuestField

FIG. 36 shows a screenshot of a FreeForm QuestField 510. A FreeForm QuestField is a text area that allows users to enter blocks of text of any size. Rather than treating the entire input as a query, a FreeForm QuestField intelligently interprets the user input as it is typed, providing the user with wide range of "on the fly" text editing enhancements. Examples include a SpellCheck QuestField that checks and corrects the user's spelling or grammar based on remote dictionaries while the user is typing, or an AutoSave QuestField that automatically saves the user's input remotely while the user is typing into the browser.

Background QuestField

A Background QuestField does not have its own user interface. Instead, it is a QuestField that can be invoked to run in the background of an application, invisibly accessing a QuestObjects service. For example, a Background QuestField could be a real-time stock price lookup function available to stored procedures in a relational database.

FIG. 37 shows a table 512 that compares six basic QuestField types. From these basic types, complex QuestFields can be derived that combine the properties of multiple QuestField types.

Protocol (QOP) Implementation Details

This section describes in detail an embodiment of the QuestObject Protocol (QOP). As described above, the QuestObjects Client and the QuestObjects Server may communicate over the Internet using the QuestObjects Protocol. QOP is an application-layer protocol. Messages may be XML formatted. They can be transported in the body of HTTP(S) messages over TCP/IP, according to the HTTP specification. The implementation of QOP described here uses XML over HTTP, but other implementations of the protocol using different transport mechanism may be provided. To prepare for different physical variations of the protocol, the Adapter design pattern may be used in the software. The description below provides the minimum number of messages that are needed to implement QuestObjects functionality. The message names, element names, and attribute names provide a possible implementation, but other implementations of the protocol using different names are envisioned. To implement specific optional features of the QuestObjects technology such as pushing, additional messages may be implemented.

In a load balancing environment using the simplest implementation of QOP, the load balancer ensures that sessions are "sticky": QOP then assumes that communication from a specific QO Client takes place with a single QO Server instance. QOP may be mixed with other XML in the same HTTP request, or wrapped into a SOAP envelope (Simple Object Access Protocol). QOP XML can support full Unicode characters sets (typically using UTF-8 encoding). Each QOP XML message contains a block of QOP messages, for example:

```
<?xml version="1.0" encoding="UTF-8" ?>
<messages xmlns="http://www.questobjects.com/qo/protocol/v10" ... >
...
</messages>
```

The messages block contains messages that validate against an XML schema. Elements in the messages block automatically adopt its default namespace. The recommended qop: namespace prefix is therefore optional, resulting in the smallest possible XML message size.

Each element of the QOP messages block is referred to as a QOP message. Every QOP message has a unique element name that logically describes its purpose. QOP messages and their attributes use so-called Wiki naming conventions: They start with a lowercase character and capitalize the first letter of each subsequent word. No consecutive capitals are ever used.

QOP messages sent from QO Clients are requests that have a unique messageIndex attribute containing a positive integer that is incremented for each message, starting at 1. The QO Server does not need to reorder requests that it receives according to the message index. It only uses the message index as an attribute in its reply so that the QO Client can match the reply to the original request. So, QOP relies on the fact that in most cases TCP/IP will deliver requests in their consecutive order. Since this is not guaranteed to happen, however, the QO Server may return an error or "no operation" results message to the QO Client if it receives a request that it cannot currently handle.

```
<anyRequestMessage messageIndex="12345" ... >
...
</anyRequestMessage>
```

Each QOP messages block that the QO Client sends to the QO Server (except the first messages block) includes a sessionId attribute containing the session id that was returned by the QO Server in the sessionStarted message.

```
<?xml version="1.0" encoding="UTF-8" ?>
<messages xmlns="http://www.questobjects.com/qo/protocol/v10"
          sessionId="4A74547885DAC49DDED925B6A0161BD5">
...
</messages>
```

Each QOP message sent from the QO Server is a reply to a QOP request from a QO Client. Each reply has a replyTo attribute that matches the messageIndex of the corresponding request.

```
<anyReplyMessage replyTo="12345" ... >
...
</anyReplyMessage>
```

QOP Client Requests startSession

This is a single QOP message sent by a QO Client to a QO Server in the very first request. It is used to create a unique session, which the QO Server confirms by returning a sessionStarted message. The QO Client must wait for sessionStarted until it can send any additional messages. If the QO Server cannot start a session, then it replies by returning an error message.

```
<startSession messageIndex="12345">
    <timeOffset>PT1078304323S</timeOffset>
    <clientControllerVersion>0.3.1</clientControllerVersion>
    <clientRuntimeName>Flash</clientRuntimeName>
    <clientRuntimeVersion>MAC 7,0,19,0</clientRuntimeVersion>
    <clientOs>Mac OS 10.3.2</clientOs>
    <clientBrowser>Mozilla/5.0 (Macintosh; U; PPC Mac OS X; en)
  AppleWebKit/124 (KHTML, like Gecko) Safari/125</clientBrowser>
</startSession>
```

The value timeOffset is an XML duration indicating the QO Client's current time in seconds from 00:00 AM on Jan. 1, 1970. In the example implementation it uses standard XML notation for durations in seconds. clientControllerVersion is the QO Client communication controller's version number, formatted as a string consisting of major version (one digit), minor version (one digit) and patch version (one or more digits) separated by decimal points (periods). A QO Server can theoretically refuse to grant sessions to deprecated client controllers depending on this version string and any of the optional version elements (described below). The other startSession elements are optional. These elements have a default value and may thus be omitted. The QO Server uses the data for logging. clientRuntimeName is a string containing the name of the QO Client's runtime environments. In the example implementation, this is set to "Flash" and the default is an Empty string. clientRuntimeVersion is a string containing the version number of the QO Client's runtime environments. In the example implementation, this is the version string of the Flash Player and the default is an Empty string. clientOS is a string that contains the name and version of the QO Client's operating system with a default of Empty string. clientBrowser is a string that contains the name and version of the QO Client's web browser. It is only mandatory if the QO Client runs in a browser environment. Default value: Empty string.

registerQuester

This message is sent by the QO Client after it has received a sessionStarted reply. The QO Server replies by either returning a corresponding questerRegistered or an error message. Multiple registerQuester messages may be grouped into a single messages block. An optional block of requestDependency messages may follow these registerQuester messages, as long as all the registerQuester messages for Questers referred to in the dependencies precede the dependency request. The QO Server does not queue requestDependency messages: A requestDependency will fail if any of the corresponding registerQuester requests arrives later.

```
<registerQuester messageIndex="12345"
    name="com.masterobjects.artist">
    <channelId>artist</channelId>
</registerQuester>
```

The registerQuester name attribute contains the name for the Quester as it was configured in the Questlet. This name must be unique among Questers that share a connection (session) and should be unique among Questers in a client application. channelId contains a string that matches the name of the Content Channel configuration file on the QO Server.

requestDependency

This message is used by a QO Client to request a dependency on another Quester. The request must be sent after the registerQuester message for both Questers, but may be grouped into the same messages block. The reason this message works with Quester names instead of Quester ID's, is that this allows the dependency requests to be sent by the client before the corresponding questerRegistered have been received. The QO Server replies by either returning a corresponding dependencyGranted or an error message.

```
<requestDependency messageIndex="12345" name="artist-on-title">
    <questerName>artistQuester</questerName>
    <onQuesterName>titleQuester</onQuesterName>
    <trigger>inputBuffer</trigger>
</requestDependency>
```

The value of the requestDependency name attribute is a string that uniquely identifies the dependency. questerName is the name of the Quester that requests to be dependent on the Quester specified in onQuesterName. onQuesterName is the name of the Quester that should trigger the dependency. The requestDependency message must contain one or more trigger elements that define the events that trigger the dependency query. The element contains one of any number of constants reflecting dependency types.

query

The QO Client sends query messages only after it has received the questerRegistered message for the corresponding Quester. The QO Server should either perform the query and return a results message containing data, refuse to perform the query and return a results message with a no-operation element explaining the reason, or return an error message if the query resulted in an error. Depending on user input speed, a Quester may send multiple query messages, but they should normally be sent as separate HTTP requests (thus containing a messages block with only a single query element), because the QO Server will only send a reply after processing all messages in the request.

```
<query messageIndex="12345" queryIndex="59">
    <questerId>5</questerId>
    <requestedRange from="0" to="2" />
    <string>be</string>
    <qualifier>CUSTOMER_APP_SESSIONID_ABCD OR
        WHATEVER</qualifier>
</query>
```

Each query sent by a Quester increments the queryIndex attribute, which is a positive integer, starting at 1 for the first query. The QO Server copies this number into the results message so that the client Quester can match those results to its original query. The QO Server will only return results for the latest query: it will return a results message containing a nop element if the query was skipped because a newer one was received.

The QO Server will return a results message containing a nop if the queryIndex received is lower than the previous queryIndex received for the same Quester. questerId is the id of the Quester as it was originally returned by the questerRegistered message. requestedRange is an empty element has two mandatory attributes from and to, which tell the QO Server which "view" of the result set the user wants. The first result in a result set corresponds to from value "0"; to is exclusive. The QO Server may return a results message containing fewer results than requested, and indicate that this matches the total number of available results. The QO Client displays the results and indicates to the user that no more results are available. The query process is finished. The QO Server may also return a results message containing the exact number of requested results or more: The QO Client displays them and the query process is finished. The QO Server may also return fewer results than indicated by the range, but indicate that the total number of results is bigger: The QO Client displays the received batch and may send a getRange message for the remainder of the result set. The string element contains the input string.

Qualifier contains the query qualifier, a string that can be used by a Content Channel to adjust its query. It is usually passed into the Questlet by the client application, or set by the user as a QuestField preference. Default value: Empty string.

getRange

A QO Client sends a getRange message to the QO Server to request a range of results. It is an optimized way for the Quester to ask for batches of results for the current query: The QO Server only returns results for results that were not yet sent in a previous results message for the same query (unless the server returns dropPrevious with value "1", meaning that previously sent results have expired). Otherwise, getRange results in the same behavior as a regular query message. A getRange should only be sent by the QO Client after receiving a reply to the corresponding query.

```
<getRange messageIndex="12345" queryIndex="60">
    <questerId>5</questerId>
    <requestedRange from="2" to="4" />
</getRange>
```

In each getRange message, queryIndex from the previous query or getRange is incremented by 1. The QO Server will only return results for the getRange with the highest queryIndex received from the QO Client; getRange requests with a lower queryIndex receive a nop reply.

stopSession

This message is sent by a QO Client to stop the session, thus allowing the QO Server to cleanup its corresponding resources. Note that, as always, the session id is derived from the sessionId attribute in the messages element. When the session is stopped by the QO Client, is includes the reason in the reason attribute, such as "submit", "disable", "suspend", "quit", or "unload" indicating that the Questlet stopped the session.

<stopSession messageIndex="12345" reason="submit" I>

QOP Server Replies sessionStarted

The QO Server returns this message in reply to a QO Client's startSession message.

```
<sessionStarted replyTo="12345"
        id="4A74547885DAC49DDED925B6A0161BD5"
        urlSuffix=";jsessionid="
        timeout="PT3600S">
    <serverId>server1</serverId>
    <serverVersion>1.0.0</serverVersion>
    <serverBuild>RC1</serverBuild>
    <providerName>Reference Customer</providerName>
    <providerDescription>Reference Server</providerDescription>
</sessionStarted>
```

The id attribute contains the unique session id that was generated by the QO Server, identifying the unique client session. After receiving this id, the QO Client includes it as the value of sessionId in consecutive messages blocks that it sends to the QO Server.

The urlSuffix attribute tells the QO Client to append its value to the URL of any subsequent HTTP requests for the same session. timeout is an XML duration that informs the QO Client about the QO Server's session timeout. serverId is the unique id of the QO Server instance running on the server machine. serverVersion is the QO Server's version number, formatted as a string consisting of major version (one digit), minor version (one digit) and patch version (one or more digits) separated by decimal points (periods). A QO Client may theoretically refuse to work with a server that it knows does not support its features by checking this version string. serverBuild is a normalized string identifying the build of the server. For example "RC1" for release candidate 1. The other elements have a default value and may thus be omitted. providerName is a string that reflects the value that was configured on the QO Server. It will usually contain the name of the company that is hosting the server. providerDescription is a string that reflects the value that was configured on the QO Server. It will usually contain a textual description of the services provided.

questerRegistered

This message is sent as the reply to a successful registerQuester message. It tells the QO Client which id is to be used for any subsequent communication for the Quester, and passed textual information about the Content Channel back to the client.

```
<questerRegistered replyTo="12345" id="5">
    <channelName>Person Name Search</channelName>
    <channelHelpText>Enter the first characters of the first or last
    name of the person you are looking for.</channelHelpText>
    <channelCopyrightText>For use by Reference Customer employees
    only.</channelCopyrightText>
</questerRegistered>
```

The id attribute is a QO Server-generated id that is unique within the server session and replaces the Quester name as the unique identifier for the Quester used in subsequent client-server communication for the session. channelName is a human-readable string as it was defined in the Content Channel configuration. Along with providerName (which was returned by sessionStarted), this uniquely identifies the Content Channel to the user.

Optional questerRegistered elements channelHelpText and channelCopyrightText contain strings containing help text, copyright text and/or usage restrictions (as it relates to the content returned by the channel) to be displayed to the user.

dependencyGranted

This message is sent as a reply to the requestDependency message, confirming that the QO Server will include dependent data in any subsequent Content Query sent to the Content Access Module.

<dependencyGranted replyTo="12345"/>

Results

The QO Server sends this message as the reply to a query or getRange request. The message either contains one or more ranges containing zero or more results, or a "no operation" element with an explanation of the reason why no results were returned. There is no guarantee that results messages arrive on the QO Client in the same order in which the QO Server sent them. Therefore, the QO Client must maintain a queue of results received, and handle them in the order of queryIndex, unless a new results message includes dropPrevious with value "1".

Results Message Variant 1

```

<range from="0" to="2" total="1000" isComplete=true
expires="PT107830438999S">
        <result>
            <value>first result string</value>
            <key>A57948</key>
            <metadata>
                <item>first metadata field</item>
                <item>second metadata field</item>
                <item>third metadata field</item>
            </metadata>
        </result>
        <result> <value>second result string</value> </result>
    </range>
    <range from="3" to="5" total="1000" isComplete=true
expires="PT107830438999S">
        <result> <value>fourth result string</value> </result>
        <result> <value>fifth result string</value> </result>
    </range>

```

Results Message Variant 2

```

<nop reason="invalidQuery" />

```

The queryIndex attribute matches the queryIndex that was included in the corresponding query or getRange request. The optional dropPrevious attribute, which defaults to "0", indicates whether the QO Server wants the QO Client to forget any previous results that were returned for the same query. In that case, dropPrevious has value "1". The results message either contains one or more range blocks, or a single nop element. An empty nop element indicates to the QO Client that the QO Server did not perform the query, or that the server refused a getRange request. The mandatory reason attribute explains the reason why by including a constant value such as invalidQuery or querySkipped. Each range block contains zero or more result blocks and has three mandatory attributes and one optional attribute. The from attribute is the index of the first result of the range. The to attribute is the index one after the last result in the range (exclusive). The total attribute is the total number of available results. This is used by the QO Client to update the UI (usually, scroll bar) and possibly to automatically send another getRange message if fewer results are sent back in this range than requested while total indicates that more results exist. The optional isComplete attribute indicates whether the server retrieved the complete result set for the query in question or whether the result set was cut-off at a certain maximum size, in which case the actual number of results might be bigger than the amount specified in the total attribute. The optional expires attribute indicates the time at which the result expires, using the number of seconds since 1970 (corrected by the difference of timeOffset and QO Server time at receipt of the startSession message). If the value is "PT0S" or if the attribute is omitted, the results do not expire. For each result set entry that exists in the specified range, the range block includes a result element. If no results exist in the range, then the range block is empty. Each result contains a value element and optional key and metadata elements. The value element contains a string that was received from the Content Engine. The optional key element contains a string that uniquely identifies the result in the Content Channel. Using the value of key, elements value and optional metadata can be fetched from the Content Engine. The optional metadata block in each result element of a range contains an ordered set of item elements. Each item is a string that matches the corresponding metadata field as it was fetched from the Content Engine. As such, an item element may be empty to represent an empty metadata string, but an empty item is never omitted. The order of the item tags matches the order in which the Content Query was defined in the Content Channel definition. If no metadata is available for a result, the metadata block is omitted from the result element and the Quester considers all metadata items empty strings.

Error

The QO Server returns an error message whenever it encounters a server-side error situation.

```
<error replyTo="12345" number="1001" sessionAlive="1">
    <errorText>An error has occurred in the QuestObjects
server.</errorText>
</error>
```

Each error has a mandatory number attribute. The optional noSession attribute indicates that there is no (longer a) session after the error occurred (value "1"). The QO Client may reconnect by calling startSession again. If this attribute is omitted or "0", then the session is either still alive, or the QO Server does not know about session state. The latter is true if, for example, the server was unable to parse the request. The errorText element contains a human-readable string that is displayed to the user. It must include any leading and trailing punctuation marks.

sessionStopped

This message is sent to the QO Client after the QO Server has successfully closed its session and cleaned up the corresponding resources.

```
<sessionStopped replyTo="12345"/>
```

Additional Optional Features—QuestObjects Client

Multi-Controller Dependencies

Multiple Client-side controllers (communicating to multiple Servers) are aware of each other so that they can register dependencies with each other. Multiple controllers on a Client communicate dependency triggers using a common notification center concept.

"Lossy" and "Non-Lossy" Pushing

Server denies a connection if it cannot guarantee queuing push replies between life beats, the interval of which is specified by the client, with a minimum enforced by the server.

Client Quester History

A Client Quester may have a history implemented as a cache in the Client controller.

Quester Context

A Quester has a unique name within its context (usually, window instance); dependencies assume the same context unless a specific context is specified.

Additional Optional Features—QuestObjects Protocol

Server Referral Mechanism

A "Dummy Server" can be installed on the "old" IP address/port so that Clients are automatically moved to a new Server. The Server sends a "Moved Permanently" message.

Client-Server Date Synchronization

Client and Server do not necessarily have to be set to the exact same date. Instead, the Client "tells" the Server its current date when it first connects, by sending a reference date, a time zone, and the number of seconds that have passed since that date. The Server will "translate" dates before sending them to the client, sending the number of seconds relative to the client's reference date.

Metadata Optional

The Client tells the Server whether metadata is required in each string transmitted to the Client. There are three moments at which metadata can be transferred to the Client: With every string in the result set, or With the current string in the result set (i.e., metadata is received automatically when a string is made the current string), or At request of the Client (the protocol allows the Client to request metadata for a range of strings). If metadata is not required, the Server only sends it to the Client at specific request.

"Metadata Displayed" Statistic

The Client tells the Server whether metadata for a string was displayed to the user or not.

Client-Side Caching

By calculating the difference between what's known on the Client and a new result set to be transmitted by the Server, Server-Client communication is limited. To this end, the protocol sends information to the Server about which result sets are still in memory on the Client. Whenever the Server (re-) sends a result set to the Client, it subtracts strings that are on the Client already.

Client-Side "Keep Alive" Protocol

In order to allow the Server to send updates (updated result sets) to the Client, the Client sends a NOP package to the Server on a regular basis. This is different from the regular way in which results are received, where the Server tells the Client that a result set is not complete by sending a Server-side NOP and the Client simply waits for the remaining results.

Transmission of Dependency Data

A mechanism by which dependencies are sent to the Server and the mechanism by which the Server includes dependency data for transmission to the Service.

BLOB Communication

The QuestObjects protocol allows the Client to directly retrieve binary large objects from a Service. This is done through a separate Channel.

Welcome Messages

When registering, the Client tells the server whether it is capable of displaying Server or Service-generated messages. A "Welcome Message" sent to the Client by Server and/or Service has the "mustDisplayToUser" attribute. If this attribute is false, then the client may ignore the message.

Dialog Messages

Servers and Services may send meaningful (textual) messages for display by the Client. Client sends optional language information to the Server at registration, allowing Server or Service to return appropriate messages. Clients are not aware of possible server-side messages. Messages carry one of the following types: Information Only; Warning; Danger; Fatal Error.

License Agreement

A Service can force a client to ask the user to agree to a license agreement before a session becomes active.

Incremental Diffed Query String

A Client may perform a DIFF on its query string so it only sends incremental difference to the Server.

Conditional DIFFing

To reduce processor load, a diff is only performed over a certain package size.

Additional Optional Features—QuestObjects Server/Service

Automatic Server Discovery

A mechanism by which a client can discover Services using a DHCP-like mechanism such as UDDI or Rendezvous.

Password Security

Each Server has an optional name/password registry.

Inter-Server Dependencies

Dependency values are known on each Server and Server-side controllers exchange the actual dependency data, even for sessions on different servers.

Server Hopping

Two Servers can exchange their cache for a specific Channel, allowing them to synchronize their result set for a particular session that was moved from one Server to another.

Service Determines Cost of Query

A Service sends the cost of each query to the Server so it can be smart about caching the most expensive queries.

Client Session Influences Cache

The Server more likely caches a result set if any client session that used the result set is still alive.

Auto-Update Queries for "Pushing" Services

An auto-updating query is sent to the Service once until the reply was sent to the Client and the auto-update interval has passed.

Smart Auto-complete on Server

If results are ordered in a known way, a Server may send a new result set to the Client if the query matches a previous "more global" query. In this case, the Service is not aware that a more specific query was performed.

Request Management

The QuestObjects server has a configurable request manager that manages the load of incoming client requests. By limiting the number of request than can be executed in parallel, and queuing requests that could not be immediately performed, the request manager helps to ensure that the QuestObjects server remains responsive in high-load situations and that the server does not overload the content-source being queried with many simultaneous queries.

Unified Query Cache

In order to improve performance on recurring queries and to limit the load imposed on the content-sources being queried, the QuestObjects server caches results to user queries by storing them in cache that is common to all users. Each user has a view into the cache on the query that he/she performed. If more than one user performs the same query, there will be one result set stored in the cache and each of these users will only have a separate view on the query. Result sets are stored in the cache until they either expire, based on a result set expiration lifetime defined in each channel configuration file, or are evicted from the cache if it is full, using a least-recently-used cache algorithm.

Additional Uses and Applications

As a technology, QuestObjects™ has surprisingly broad potential. Applications include a wide range of markets including implementation on "connected devices" such as PDAs, set top boxes and cell phones. Other applications include those listed below. In applying the QuestObjects technology, existing applications may make use of enhanced functionality, including: Improved user friendliness; Improved speed of data entry; Improved quality of data entry; Quicker access to relevant data; Increased security of data entry; Increased security of data retrieved; Better control over usage patterns; Guarantee over strings displayed and used; and the ability Easily deliver and charge for content.

Auto-Complete, Type-Ahead:

In a typical application, users enter data into a field (entry field, cell phone, PDA) that automatically completes information typed. A client application can implement multiple QuestObjects™ components (called Questlets™ that possibly have multiple ways of querying the server using Quester™ instances, or QuestFields™ in specific situations) that share a connection to one or more QuestObjects™ servers. Multiple Questers™ can depend on each other for the data they retrieve. Depending on the client technology used, a Questlet™ can copy values to and from existing (web) forms or application windows.

Popup-Lists:

A QuestObjects™-enabled popup-list dynamically displays data that corresponds to a single query in the content engine. The associated Quester™ can take values from another QuestField™ so that the popup-list displays appropriate data that is continuously updated to reflect dependent data.

Look-Up, Finding Simple Reference Data (Dictionary, Thesaurus, Addresses, Etc)

A (possibly invisible) QuestField™ returns a string with optional XML-formatted metadata. This XML-formatted metadata could be data displayed in a separate area of the Questlet™. A return string or its metadata could also contain a URL to data that is to be displayed. Depending on the client platform, data displayed could easily be in any multimedia format (image, sound, movie, streaming or not).

Usage Histories (URLs, Words Previously Used, Etc.)

As an authenticated user uses QuestObjects™, the service tier stores usage histories. These are not only useful for doing statistics and invoicing, but can also be used for separate Questlets™ or Quester™ instances that disclose the usage history to the user or to an application that uses QuestObjects™ internally. In this scenario, a web browser could automatically store URLs visited in a QO service, so that the user has persistent access to the browser history, regardless of the workstation (or connected device) on which the browser is used.

Spell-Checking on the Fly

Since QuestObjects™ only transfers modifications to documents over the network, it can efficiently keep track of modifications made to text blocks. Dedicated spell-checking Questlets™ can be created that perform spell checking on-the-fly on any platform that supports QuestObjects™, including web browsers.

On-the-Fly Verification of Credit Card, Bank Numbers Etc.

Due to its inherent security features, QuestObjects™ technology can be used to check the validity of credit card (or similar) information while a user is entering data. The verification can take place before the entire web page is submitted to the server, or before database transactions are committed in a client/server system.

Decision Support Systems, Sensor Control Systems

QuestObjects™ services (content channels) continuously receive increasingly accurate information from client systems. This continuous nature (combined with the secure and fast communication protocol) allow decision support systems to immediately respond with appropriate actions to be taken by the client.

Verified and Guaranteed Display of Advertisements

Using pushing QuestObjects™ technology, Questlets™ provide a way to deliver content to client systems. Given certification of the client Questlet™, the content provider (service) knows exactly what part of the content was viewed and used.

Real-Time News Services

The pushing nature of QuestObjects™ allows real-time delivery of news to any client that supports the efficient QuestObjects™ protocol.

Composition of Ultra-Secure Documents (Continuously Backed Up on the Server)

A QuestObjects™ service automatically receives each and every modification to client data. This provides a highly secure way of updating critical documents, where each modification is present on the server within a minimum amount of time. Persistent Questers™ can be restored automatically after recovery of a lost connection or after rebooting a crashed client.

The preceding detailed description illustrates software objects and methods of a system implementing the present invention. By providing a simple and standardized interface between Client components and any number of Content Engines that accept string-based queries, the present invention gives content publishers, web publishers and software developers an attractive way to offer unprecedented interactive, speedy, up-to-date and controlled access to content without the need to write an access mechanism for each content source.

In addition to acting as a standardized gateway to any content engine, the present invention can intelligently cache query results, distribute Services over a network of Servers, validate user and other client input, authorize user access and authenticate client software components as needed. These and other optional services are provided by the present invention without requiring additional work on the part of software developers or content publishers. Publishers can also keep track of usage statistics, on a per-user basis as required allowing flexible billing of content access. Content Access Modules allow software developers and vendors of Content Engines such as database vendors and search engine vendors to create simplified ways for developers and implementers of such content engines to disclose information through the present invention.

End users of the present invention experience an unprecedented level of user-friendliness accessing information that is guaranteed to be up-to-date while being efficiently cached for speedy access as the number of simultaneous users grows.

The present invention can be implemented on any client and server system using any combination of operating systems and programming languages that support asynchronous network connections and preferably but not necessarily pre-emptive multitasking and multithreading. The interface of the present invention as it appears to the outside world (i.e. programmers and developers who provide access to end users and programmers who provide Content Access Modules to Content Engines used by content publishers) is independent of both the operating systems and the programming languages used. Adapters can be built allowing the tiers of the system to cooperate even if they use a different operating system or a different programming language. The protocol of the present invention can be implemented on top of networking standards such as TCP/IP. It can also take advantage of inter-object communication standards such as CORBA and DCOM. The object model of the present invention can be mapped to most other programming languages, including Java, C++, C#, Objective C and Pascal.

Third-party vendors of software development and database management tools can create components that encapsulate the present invention so that users of those tools can access its functionality without any knowledge of the underlying protocols and server-side solutions. For example, a tool vendor can add an 'auto-complete field' to the toolbox of the development environment allowing developers to simply drop a Questlet into their application. In order to function correctly, the auto-complete field would only need a reference to the QuestObjects Server and one or more QuestObjects Services, but it would not require any additional programming.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for enabling searches of content at a server, comprising:
　a server which is configured to receive queries from clients for content;
　a communication protocol which enables an asynchronous connection between the clients and the server, and allows each client to communicate, under control of a user and as part of a session, a plurality of consecutive query strings to query the server for content; and
　a query and result cache that stores one or more query strings previously communicated from the clients, or content results previously returned from the server;
　wherein each of the clients provides an input field, which allows the user to enter as an input a query comprised of a plurality of consecutive query strings, and wherein the client transmits to the server within the session a plurality of queries to retrieve content from the server matching or related to the plurality of consecutive query strings, wherein each of the plurality of queries form an increasingly lengthening query string for retrieving content from the server; and
　wherein the server receives the plurality of queries from the requesting client, and in response to receiving each of one or more additional characters in the increasingly lengthening query string as they are being entered at the input field,
　　automatically matches the increasingly lengthening query string initially by matching the query string against the content of the query and result cache, and subsequently by matching the query string against other content available to the server, and
　　asynchronously returns, while the increasingly lengthening query string is being entered by the user at the input field at the client, increasingly relevant content to the client.

2. The system of claim 1, further comprising a web browser at the client for allowing the user to create a plurality of queries, wherein the plurality of queries are entered into the web-based interface by the user to form an increasingly lengthening query string for retrieving content from the server, and wherein the client and the server communicate via the Internet using a hypertext transfer protocol.

3. The system of claim 1, wherein each of the plurality of queries are a single additional character to be added to the increasingly lengthening query string.

4. The system of claim 1, wherein each of the plurality of queries are a plurality of additional characters to be added to the increasingly lengthening query string.

5. The system of claim 1, further compromising a connection to one or more content engines, each using a communication protocol native to said content engine, whereby said content engines are queried if the query and result cache contains no matches for the user query, and whereby the results from these content engines queries are merged and returned to the client.

6. The system of claim 1, wherein the system is provided as a people-searching system, and wherein the server is configured to receive requests from clients for people-searching content.

7. The system of claim 1, wherein the server is configured to receive requests from clients for product-related information.

8. The system of claim 1, wherein the system is provided as a system for searching for documents in full-text databases.

9. The system of claim 1, wherein said clients accumulate a plurality of single characters as they are entered into the client, before sending the plurality of said single characters joined together as one of the plurality of consecutive query strings, to said server.

10. The system of claim 1, wherein said client or a client software adds an additional qualifier value to the query strings that are passed to the server, and wherein the server can use said qualifier to execute the query on said content engines, and return appropriate results based on both each query string and the qualifier value.

11. The system of claim 1, wherein said content returned by the server comprises lists of strings, wherein each string is accompanied by corresponding metadata, and wherein the metadata includes logical links to other data sources or Uniform Resource Identifiers.

12. The system of claim 1, wherein said client input field includes a visual area that contains rotating arrows indicating that queries are being performed, or static symbols that represent the status of the session and the available results while no queries are active.

13. A method for enabling searches of content at a server, comprising the steps of: providing access to a server which is configured to receive queries from clients for content;
　providing a communication protocol which enables an asynchronous connection between the clients and the server, and allows each client to communicate, under control of a user and as part of a session, a plurality of consecutive query strings to query the server for content; and
　providing access to a query and result cache that stores one or more query strings previously communicated from the clients, or content results previously returned from the server;
　wherein each of the clients provides an input field, which allows the user to enter as an input a query comprised of a plurality of consecutive query strings, and wherein the client transmits to the server within the session a plurality of queries to retrieve content from the server matching or related to the plurality of consecutive query strings, wherein each of the plurality of queries form an increasingly lengthening query string for retrieving content from the server; and wherein the server receives the queries from one of the clients, and in response to receiving each of one or more additional characters in the increasingly lengthening query string as they are being entered at the input field,
　automatically matches the increasingly lengthening query string initially by matching the query string against the content of the query and result cache, and subsequently by matching the query string against other content available to the server, and
　asynchronously returns, while the increasingly lengthening query string is being entered by the user at the input field at the client, increasingly relevant content to the client.

14. The method of claim 13, further comprising providing a web browser at the client for allowing the user to create a plurality of queries, wherein the plurality of queries are entered into the web-based interface by the user to form an increasingly lengthening query string for retrieving content from the server, and wherein the client and the server communicate via the Internet using a hypertext transfer protocol.

15. The method of claim 13, wherein each of the plurality of queries are a single additional character to be added to the increasingly lengthening query string.

16. The method of claim 13, wherein each of the plurality of queries are a plurality of additional characters to be added to the increasingly lengthening query string.

17. The method of claim 13, wherein the system is provided as a people-searching system, and wherein the server is configured to receive requests from clients for people-searching content.

18. The method of claim 13, wherein the server is configured to receive requests from clients for product-related information.

19. The method of claim 13, wherein the system is provided as a system for searching for documents in full-text databases.

20. A non-transitory computer readable medium, including instructions stored thereon which when read and executed cause the computer to perform the steps comprising: providing access to a server which is configured to receive queries from clients for content;

providing a communication protocol which enables an asynchronous connection between the clients and the server, and allows each client to communicate, under control of a user and as part of a session, a plurality of consecutive query strings to query the server for content; and providing access to a query and result cache that stores one or more query strings previously communicated from the clients, or content results previously returned from the server;

wherein each of the clients provides an input field, which allows the user to enter as an input a query comprised of a plurality of consecutive query strings, and wherein the client transmits to the server within the session a plurality of queries to retrieve content from the server matching or related to the plurality of consecutive query strings, wherein each of the plurality of queries form an increasingly lengthening query string for retrieving content from the server; and wherein the server receives the queries from one of the clients, and in response to receiving each of one or more additional characters in the increasingly lengthening query string as they are being entered at the input field, automatically matches the increasingly lengthening query string initially by matching the query string against the content of the query and result cache, and subsequently by matching the query string against other content available to the server, and asynchronously returns, while the increasingly lengthening query string is being entered by the user at the input field at the client, increasingly relevant content to the client.

* * * * *